(12) United States Patent
Sato et al.

(10) Patent No.: US 7,158,117 B2
(45) Date of Patent: Jan. 2, 2007

(54) COORDINATE INPUT APPARATUS AND CONTROL METHOD THEREOF, COORDINATE INPUT POINTING TOOL, AND PROGRAM

(75) Inventors: Hajime Sato, Kanagawa (JP); Yuichiro Yoshimura, Kanagawa (JP); Katsuyuki Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 10/629,621

(22) Filed: Jul. 30, 2003

(65) Prior Publication Data

US 2005/0091297 A1    Apr. 28, 2005

(30) Foreign Application Priority Data

Jul. 30, 2002    (JP)    ............... 2002-221819

(51) Int. Cl.
*G09G 5/08*    (2006.01)

(52) U.S. Cl. ................ 345/158; 178/18.03; 178/19.01; 345/173

(58) Field of Classification Search ................ 345/173, 345/175, 178, 179, 158; 382/106; 178/18.01, 178/18.03, 18.04, 19.01, 19.02
See application file for complete search history.

(56) References Cited

U.S. PATENT DOCUMENTS

| | | | | |
|---|---|---|---|---|
| 4,667,182 A | * | 5/1987 | Murphy | 340/407.2 |
| 4,695,680 A | * | 9/1987 | Kable | 178/19.01 |
| 4,764,885 A | * | 8/1988 | Greanias et al. | 345/179 |
| 4,903,012 A | * | 2/1990 | Ohuchi | 345/178 |
| 6,518,959 B1 | * | 2/2003 | Ito et al. | 345/175 |
| 6,700,129 B1 | * | 3/2004 | Usuda et al. | 250/559.29 |
| 6,710,770 B1 | * | 3/2004 | Tomasi et al. | 345/168 |
| 6,717,073 B1 | * | 4/2004 | Xu et al. | 178/18.04 |
| 6,753,847 B1 | * | 6/2004 | Kurtenbach et al. | 345/156 |
| 6,862,019 B1 | * | 3/2005 | Kobayashi et al. | 345/173 |
| 6,933,934 B1 | * | 8/2005 | Amemiya | 345/179 |
| 2004/0021645 A1 | * | 2/2004 | Kobayashi et al. | 345/173 |

* cited by examiner

*Primary Examiner*—Amr A. Awad
*Assistant Examiner*—Tom Sheng
(74) *Attorney, Agent, or Firm*—Fitzpatrick, Cella, Harper & Scinto

(57) ABSTRACT

The position coordinates of a coordinate input pen are calculated. The position coordinates are changed on the basis of, of the calculated position coordinates, predetermined coordinates related to the distance between the coordinate input surface and the coordinate input pen. The changed position coordinates are output.

4 Claims, 25 Drawing Sheets

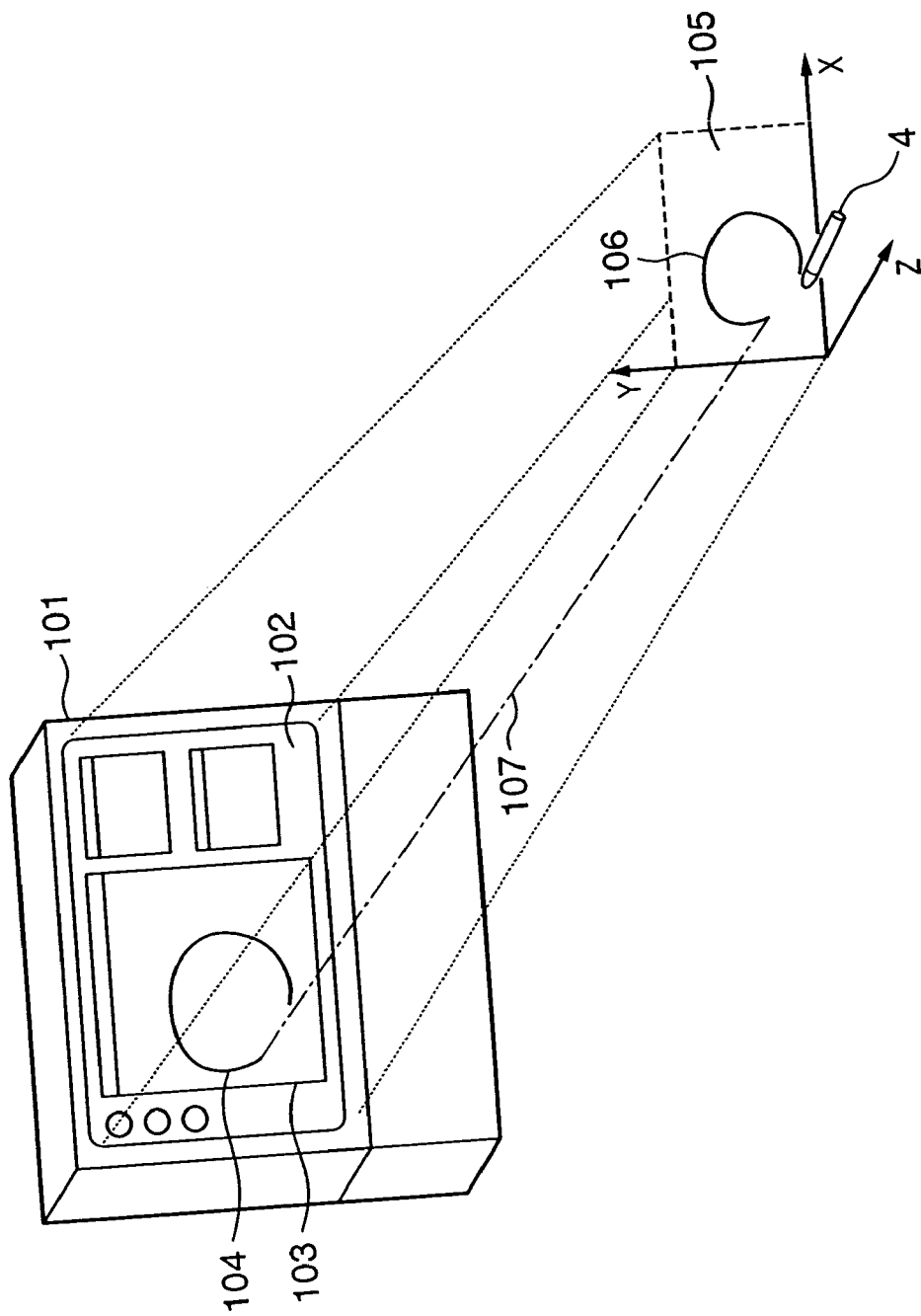

FIG. 4

| | CURSOR ON SCREEN | STATE OF PEN (SCREEN STATE) | PEN SIDE SWITCH : STATE |
|---|---|---|---|
| 1 | 104 POINT B POINT A | STOP (CURSOR STOP) | SWITCH42a : OFF SWITCH42b : OFF |
| 2 | POINT A POINT B 104 | OSCILLATION (CURSOR MOVEMENT) | SWITCH42a : ON SWITCH42b : OFF |
| 3 | POINT A POINT B 104 | OSCILLATION (DRAW) | SWITCH42a : ON SWITCH42b : ON |
| 4 | POINT A POINT B 104 | STOP (CURSOR STOP) | SWITCH42a : OFF SWITCH42b : OFF |

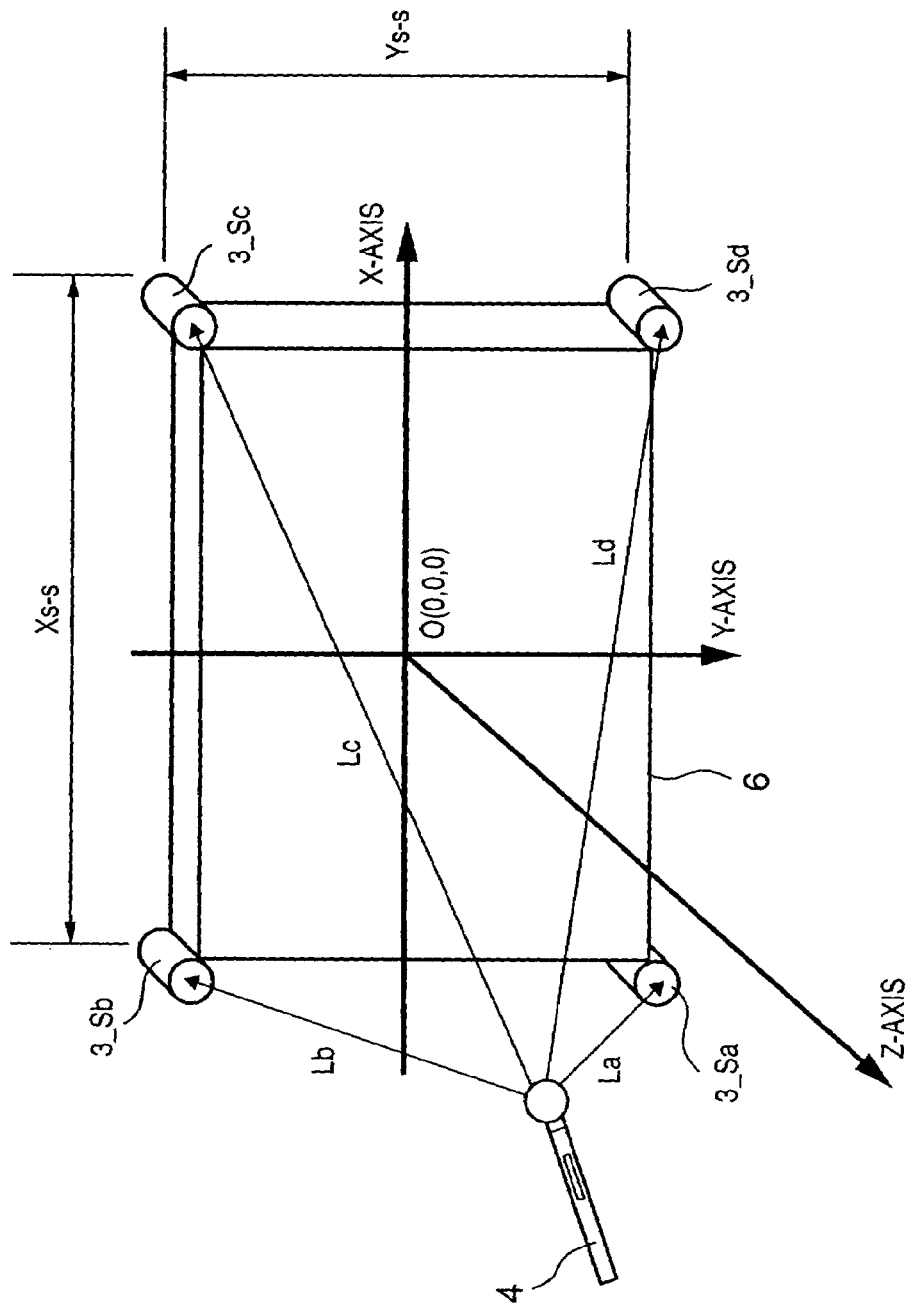

FIG. 13

| OPERATION MODE | PEN | | | | MAIN BODY | | |
| --- | --- | --- | --- | --- | --- | --- | --- |
| | SW41 | SW42a | SW42b | DRIVING INTERVAL (T) | OUTPUT COORDINATE MODE | Z-AXIS DIRECTION COORDINATE VALUES | RELATIVE COORDINATES ΔXΔY, MAGNIFICATION $k_n$ |
| PEN INPUT (Mode=1) | ON | OFF | OFF | T1 | ABSOLUTE COORDINATES | 50 mm OR LESS | |
| PROXIMITY INPUT (Mode=2) | ON→OFF | OFF | OFF | T11 | ABSOLUTE COORDINATES | 300 mm OR LESS | |
| REMOTE INPUT1 (Mode=3) | OFF | ON | OFF | T2 | RELATIVE COORDINATES | 400 mm OR MORE | $k_0$ |
| REMOTE INPUT2 (Mode=4) | OFF | ON | ON | T21 | RELATIVE COORDINATES | 400 mm OR MORE | $k_0$ |
| REMOTE INPUT1,2 (Mode=3,4) | OFF | ON | ON or OFF | T2 or T21 | RELATIVE COORDINATES | 0.4 ~ 2m | $k_1$ |
| REMOTE INPUT1,2 (Mode=3,4) | OFF | ON | ON or OFF | T2 or T21 | RELATIVE COORDINATES | 2 ~ 4m | $k_2$ |
| REMOTE INPUT1,2 (Mode=3,4) | OFF | ON | ON or OFF | T2 or T21 | RELATIVE COORDINATES | 4 m OR MORE | $k_3$ |

FIG. 16

| PEN OPERATION MODE | | PEN POINT SW41 | PEN SIDE SW1 42a | PEN SIDE SW2 42b | Z-AXIS DIRECTION CALCULATED COORDINATE VALUES | OUTPUT COORDINATE VALUES | |
|---|---|---|---|---|---|---|---|
| | | | | | | ABSOLUTE COORDINATES | RELATIVE COORDINATES |
| | PEN UP | PEN DOWN | | | | | | |
| PEN INPUT | ○ | | OFF | OFF | OFF | — | — | — |
| | | ○ | ON | — | — | (0) | ○ | |
| PROXIMITY INPUT | ○ | | OFF | ON | OFF | PREDETERMINED VALUE 1 OR LESS | ○ | |
| | ○ | | OFF | OFF | ON | PREDETERMINED VALUE 1 OR LESS | ○ | |
| | | ○ | OFF | ON | ON | PREDETERMINED VALUE 1 OR LESS | ○ | |
| REMOTE INPUT | ○ | | OFF | ON | OFF | PREDETERMINED VALUE 2 OR MORE | | ○ |
| | ○ | | OFF | OFF | ON | PREDETERMINED VALUE 2 OR MORE | | ○ |
| | | ○ | OFF | ON | ON | PREDETERMINED VALUE 2 OR MORE | | ○ |

F I G. 22
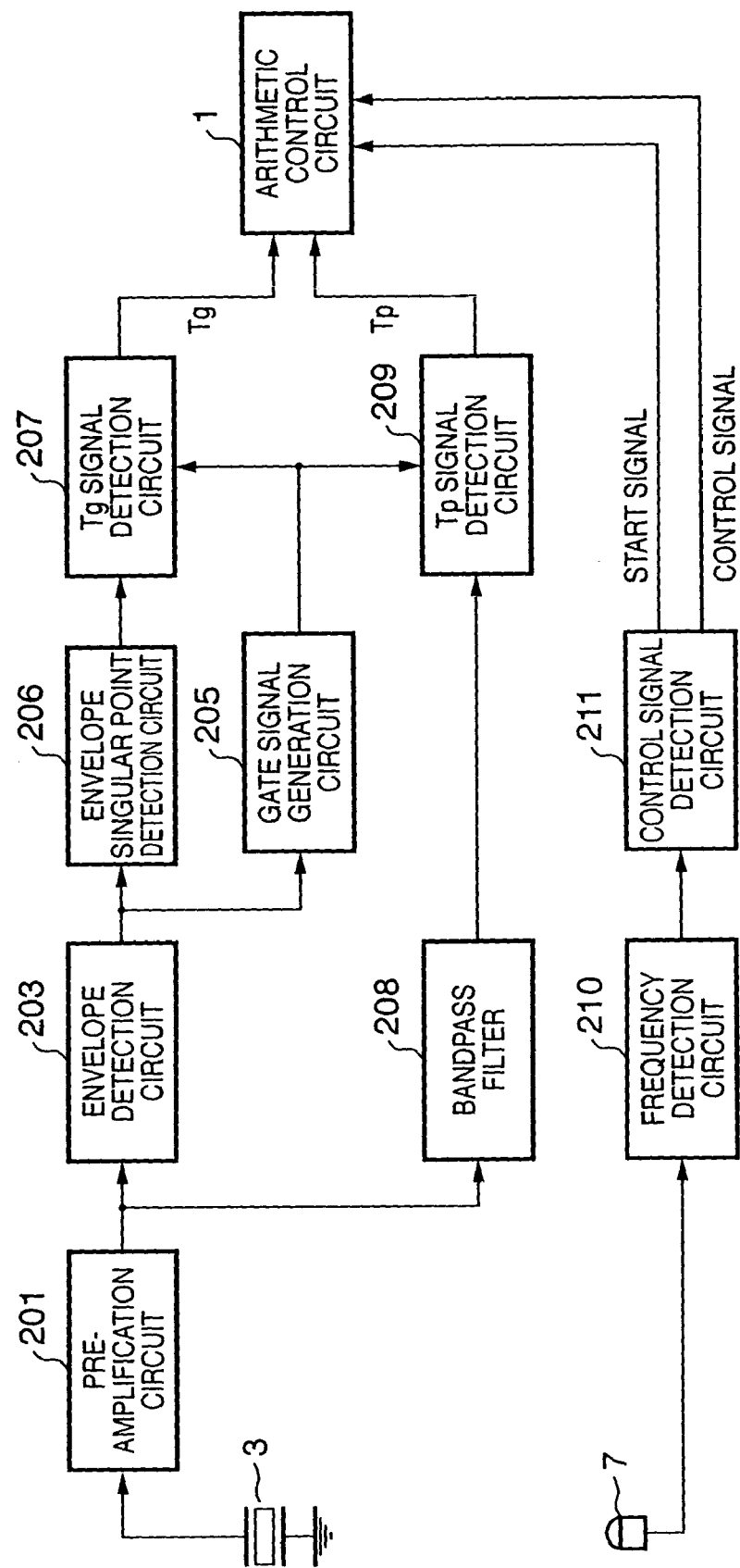

FIG. 24

| PEN OPERATION MODE | | PEN POINT SW41 | SW1 42a | SW2 42b | Z-AXIS DIRECTION CALCULATED COORDINATE VALUES | COORDINATE EFFECTIVE | OUTPUT COORDINATE VALUES | |
|---|---|---|---|---|---|---|---|---|
| PEN UP | PEN DOWN | | | | | | ABSOLUTE COORDINATES | RELATIVE COORDINATES |
| ○ | | OFF | OFF | OFF | — | — | — | — |
| — | ○ | ON | — | — | Z=0 | ○ | ○ | |
| PEN INPUT | | | | | | | | |
| — | | ON | — | — | 0<Z<PREDETERMINED VALUE1 | × | — | |
| ○ | | OFF | ON | OFF | 0<Z<PREDETERMINED VALUE1 | ○ | ○ | |
| ○ | | OFF | OFF | ON | 0<Z<PREDETERMINED VALUE1 | ○ | ○ | |
| | ○ | OFF | ON | ON | 0<Z<PREDETERMINED VALUE1 | ○ | ○ | |
| PROXIMITY INPUT | | | | | | | | |
| — | | ON | — | — | PREDETERMINED VALUE2<Z | × | — | — |
| ○ | | OFF | ON | OFF | PREDETERMINED VALUE2<Z | ○ | | ○ |
| ○ | | OFF | OFF | ON | PREDETERMINED VALUE2<Z | ○ | | ○ |
| | ○ | OFF | ON | ON | PREDETERMINED VALUE2<Z | ○ | | ○ |
| REMOTE INPUT | | | | | | | | |

COORDINATE INPUT APPARATUS AND CONTROL METHOD THEREOF, COORDINATE INPUT POINTING TOOL, AND PROGRAM

FIELD OF THE INVENTION

The present invention relates to a coordinate input apparatus which calculates the position coordinates of a coordinate input pointing tool with respect to a coordinate input surface, a control method of the coordinate input apparatus, a coordinate input pointing tool, and a program.

BACKGROUND OF THE INVENTION

Conventionally, apparatuses which can realize a paper-pencil relationship are known, in which a coordinate input apparatus capable of inputting coordinates is placed on the display screen of a display apparatus such as a CRT display, a liquid crystal display (LCD), or a projector so that operator's pointing or handscript by a pointing tool is displayed on the display apparatus.

There are coordinate input apparatuses of a type that uses a transparent input plate, including a resistive film type, an electrostatic type, and an ultrasonic wave type which propagates an ultrasonic wave to a coordinate input surface made of glass or the like. Some coordinate input apparatuses are of an optical type or type which detects a position by radiating a sonic wave into the air. In some coordinate input apparatuses of an electromagnetic induction (electromagnetic transmitting/receiving) type, a mechanism for calculating coordinates is placed behind a display apparatus while a transparent protective plate is placed in front of the display apparatus, thereby constructing an input/output integrated information device.

Such information devices have been used for electronic notepads at first. Along with an increase in the size of display apparatuses, information devices such as a relatively large pen input computer are also becoming popular. Such information devices are combined with wide-screen display apparatuses such as front projectors, rear projectors, or PDPs and used as, e.g., presentation apparatuses or video conference systems. For display apparatuses such as wide-screen liquid crystal displays or PDP displays, image quality improvement and cost reduction are still progressing. As satellite broadcasting and the like are switching to digital broadcasting systems, the specifications and forms of TV sets are also entering a transitory stage.

These wide-screen display apparatuses are replacing, e.g., whiteboards or electronic blackboards used in offices and are used at meetings or briefings by displaying material data that are prepared in personal computers in advance on the wide-screen display apparatuses. In this case, information displayed on the wide-screen display apparatus can be updated by an operator or a person present by directly touching the screen like a whiteboard so that, e.g., the display contents on the display screen can be switched by controlling the personal computer.

However, large-scale input/output integrated systems of this type have the following problems.

When a briefing assuming many participants or use environment through a network is taken into consideration, it is more preferable that, e.g., a questioner be able to operate the screen from his/her position by remote control or obtain information from the network from his/her position, as needed, in addition to control of a personal computer by causing an operator to directly touch the screen.

When a conventional apparatus of this type is used to perform input (remote control) from a position spaced apart from the screen, a relative coordinate scheme is used, in which the cursor moving amount is calculated on the basis of the differential value from the preceding coordinates, like a mouse that operates a computer.

Hence, the operator checks the current cursor position displayed on the screen, moves the cursor from that position to a desired position, and further moves the cursor while drawing a graphic pattern or the like.

More specifically, if the system turns on/off a signal to be transmitted to the coordinate input apparatus main body by pressing a button on a coordinate input pointing tool, the drawing operation is performed by repeating cursor movement, drawing (cursor movement), stop, cursor movement, and drawing (cursor movement) by turning on/off the switch.

However, the stroke amount by operation (by moving the hand) and the cursor moving amount are in a 1:1 correspondence (i.e., when the input device is moved by 10 cm, the cursor on the screen also moves by 10 cm) even when ten input position is far apart from the screen. When the operator wants to input a stroke long relatively to the screen, i.e., when the operator wants to perform one stroke operation without transmission stop operation, he/she needs to do a large action although the screen size seems to be relatively small for him/her because of the distance between the screen and the input position, resulting in considerable difficulty in input operation.

In some systems, the cursor displayed on the screen is moved by operating cursor keys. Such a system is excellent in operability for cursor movement. However, it is not always suitable in drawing a character or graphic pattern.

SUMMARY OF THE INVENTION

The present invention has been made in consideration of the above situation, and has as its object to provide a coordinate input apparatus which can efficiently and appropriately input coordinates in each of a plurality of input states, a control method of the coordinate input apparatus, a coordinate input pointing tool, and a program.

According to the present invention, the foregoing object is attained by providing a coordinate input apparatus which calculates position coordinates of a coordinate input pointing tool with respect to a coordinate input surface, comprising:

calculation means for calculating the position coordinates of the coordinate input pointing tool;

change means for changing the position coordinates on the basis of predetermined coordinates related to a distance between the coordinate input surface and the coordinate input pointing tool; and output means for outputting the position coordinates changed by the change means.

In a preferred embodiment, the change means changes the position coordinates by multiplying the position coordinate values by a predetermined coefficient on the basis of the coordinates related to the distance between the coordinate input surface and the coordinate input pointing tool.

In a preferred embodiment, the apparatus further comprises interpolation means for interpolating the position coordinates changed by the change means.

In a preferred embodiment, the coordinate input pointing tool further comprises ultrasonic wave generation means for generating an ultrasonic wave to input a position to the coordinate input surface.

According to the present invention, the foregoing object is attained by providing a coordinate input apparatus which calculates position coordinates of a coordinate input pointing tool with respect to a coordinate input surface on which an X-Y plane and a Z-axis with respect to the X-Y plane are defined, comprising:

calculation means for calculating the position coordinates (X,Y,Z) of the coordinate input pointing tool;

determination means for determining an operative state of a predetermined switch of the coordinate input pointing tool;

comparison means for comparing a predetermined value with a Z-coordinate value of the (X,Y,Z) coordinate values calculated by the calculation means, on the basis of a determination result of the determination means; and control means for controlling output of the position coordinates (X,Y,Z) calculated by the calculation means, on the basis of the determination result of the determination means or the determination result of the determination means and a comparison result of the comparison means.

In a preferred embodiment, the control means determines a coordinate output form of the position coordinates (X,Y,Z) calculated by the calculation means, on the basis of the determination result of the determination means or the determination result of the determination means and the comparison result of the comparison means.

In a preferred embodiment, the coordinate output form includes a first coordinate output form in which at least (X,Y) coordinate values of the position coordinates (X,Y,Z) calculated by the calculation means are output, and a second coordinate output form in which differential coordinate values (X,Y,Z) as differences between predetermined position coordinates calculated by the calculation means and position coordinates (X,Y,Z) calculated by the calculation means later as the coordinate input pointing tool moves are output.

In a preferred embodiment, the control means determines a presence/absence of the output of the position coordinates on the basis of the determination result of the determination means or the determination result of the determination means and the comparison result of the comparison means.

In a preferred embodiment, when the determination result of the determination means indicates that the predetermined switch is in the operative state, the control means outputs at least (X,Y) coordinate values of the position coordinates (X,Y,Z) calculated by the calculation means.

In a preferred embodiment, when the determination result of the determination means indicates that the predetermined switch is not in the operative state, and the comparison result of the comparison means indicates that the Z-coordinate value is not more than the predetermined value, the control means outputs at least (X,Y) coordinate values of the position coordinates (X,Y,Z) calculated by the calculation means.

In a preferred embodiment, the apparatus further comprises storage means for storing the predetermined position coordinates (X,Y,Z) calculated by the calculation means as first position coordinates, and difference calculation means for calculating differences between the first coordinate values (X,Y,Z) stored in the storage means and position coordinates (X,Y,Z) calculated by the calculation means later as the coordinate input pointing tool moves, and when the determination result of the determination means indicates that the predetermined switch is not in the operative state, and the comparison result of the comparison means indicates that the Z-coordinate value is not less than the predetermined value, the control means outputs the differential coordinate values (X,Y,Z) obtained by the difference calculation means.

In a preferred embodiment, the apparatus further comprises continuous input state determination means for determining on the basis of a coordinate calculation sampling rate of the calculation means whether input by the coordinate input pointing tool is in a continuous input state, and the predetermined position coordinates are first coordinate values of effective coordinate values during the continuous input state based on the determination result of the continuous input state determination means.

In a preferred embodiment, when the determination result of the determination means indicates that the predetermined switch is in the operative state, and the comparison result of the comparison means indicates that the coordinate value equals the predetermined value, the control means does not output the position coordinates (X,Y,Z) calculated by the calculation means.

According to the present invention, the foregoing object is attained by providing a coordinate input pointing tool of a coordinate input apparatus having a coordinate input surface on which an X-Y plane and a Z-axis with respect to the X-Y plane are defined, comprising:

a first switch which is arranged at a distal end portion and can be pressed;

at least two, second and third switches which are arranged on a housing of the coordinate input pointing tool; and production means for producing a first control signal when at least one of the second and third switches is in an operative state and producing a second control signal when both of the second and third switches are in the operative state.

In a preferred embodiment, the production means produces the first control signal when the first switch is in the operative state.

In a preferred embodiment, the second and third switches are arranged adjacent to each other in parallel to an axis of the housing.

In a preferred embodiment, the second and third switches are arranged adjacent to each other along an axis of the housing.

According to the present invention, the foregoing object is attained by providing a control method of a coordinate input apparatus which calculates position coordinates of a coordinate input pointing tool with respect to a coordinate input surface, comprising:

a calculation step of calculating the position coordinates of the coordinate input pointing tool;

a change step of changing the position coordinates on the basis of predetermined coordinates related to a distance between the coordinate input surface and the coordinate input pointing tool; and an output step of outputting the position coordinates changed in the change step.

According to the present invention, the foregoing object is attained by providing a control method of a coordinate input apparatus which calculates position coordinates of a coordinate input pointing tool with respect to a coordinate input surface on which an X-Y plane and a Z-axis with respect to the X-Y plane are defined, comprising:

a calculation step of calculating the position coordinates (X,Y,Z) of the coordinate input pointing tool;

a determination step of determining an operative state of a predetermined switch of the coordinate input pointing tool;

a comparison step of comparing a predetermined value with a Z-coordinate value of the (X,Y,Z) coordinate values calculated in the calculation step, on the basis of a determination result in the determination step; and a control step of controlling output of the position coordinates (X,Y,Z) calculated in the calculation step, on the basis of the determination result in the determination step or the determination result in the determination step and a comparison result in the comparison step.

According to the present invention, the foregoing object is attained by providing a program which causes a computer to control a coordinate input apparatus which calculates position coordinates of a coordinate input pointing tool with respect to a coordinate input surface, comprising:

a program code for a calculation step of calculating the position coordinates of the coordinate input pointing tool;

a program code for a change step of changing the position coordinates on the basis of predetermined coordinates related to a distance between the coordinate input surface and the coordinate input pointing tool; and a program code for an output step of outputting the position coordinates changed in the change step.

According to the present invention, the foregoing object is attained by providing a program which causes a computer to control a coordinate input apparatus which calculates position coordinates of a coordinate input pointing tool with respect to a coordinate input surface on which an X-Y plane and a Z-axis with respect to the X-Y plane are defined, comprising:

a program code for a calculation step of calculating the position coordinates (X,Y,Z) of the coordinate input pointing tool;

a program code for a determination step of determining an operative state of a predetermined switch of the coordinate input pointing tool;

a program code for a comparison step of comparing a predetermined value with a Z-coordinate value of the (X,Y,Z) coordinate values calculated in the calculation step, on the basis of a determination result in the determination step; and a program code for a control step of controlling output of the position coordinates (X,Y,Z) calculated in the calculation step, on the basis of the determination result in the determination step or the determination result in the determination step and a comparison result in the comparison step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a schematic view of a coordinate input system using a coordinate input apparatus according to each embodiment of the present invention;

FIG. 4 is a view showing an input example when the cursor on the screen is displayed in the first embodiment of the present invention;

FIG. 12 is a view for explaining the coordinate system according to the first embodiment of the present invention;

FIG. 13 is a table for explaining the operation modes of the coordinate input pen according to the first embodiment of the present invention;

FIG. 16 is a table for explaining the operation modes of a coordinate input pen according to the second embodiment of the present invention;

FIG. 22 is a block diagram of a detection circuit which realizes sonic wave arrival time detection according to the second embodiment of the present invention;

FIG. 24 is a table for explaining the operation modes of a coordinate input pen according to the third embodiment of the present invention.

DETAILED DESCRIPTION OF THE PREFERRED EMBODIMENTS

Figure 2A:
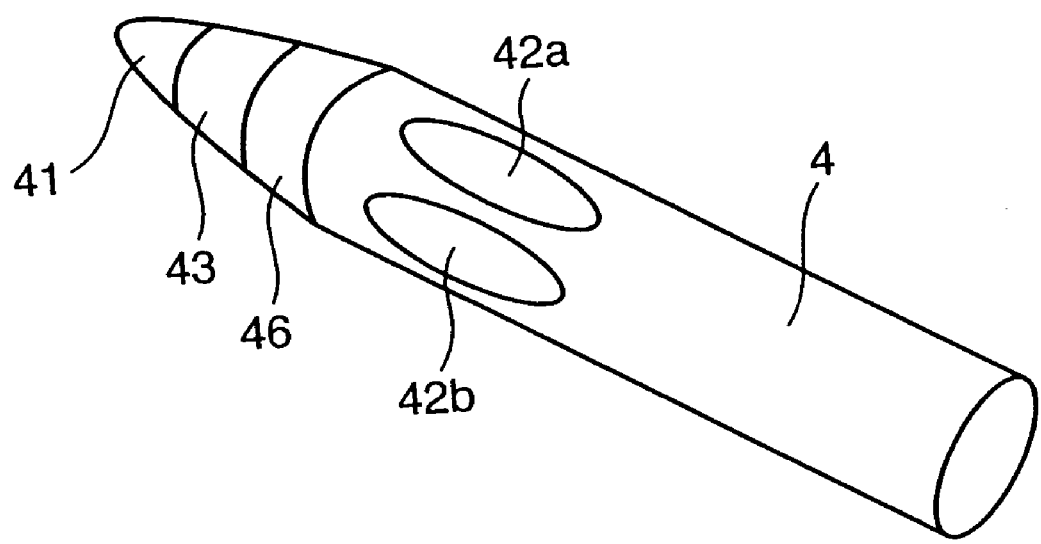
FIGS. 2A and 2B are views showing the structure of a coordinate input pen of the coordinate input apparatus according to the first embodiment of the present invention.

The preferred embodiments of the present invention will be described below in detail with reference to the accompanying drawings.

First Embodiment

Description of System Configuration (FIG. 1)

FIG. 1 is a schematic view of a coordinate input system using a coordinate input apparatus according to each embodiment of the present invention.

The coordinate input system shown in FIG. 1 is constituted by incorporating a coordinate input apparatus in a rear projection display apparatus 101.

This coordinate input system is a coordinate input/output integrated system. Various kinds of information output from a computer connected to the coordinate input apparatus are displayed on a screen 102 of the rear projection display apparatus 101. A coordinate input pen 4 serving as a pointing tool can input coordinate data by directly touching the screen 102.

The coordinate data can be used for icon operation (computer operation) or as cursor movement or graphic drawing (cursor locus).

The coordinate input apparatus calculates the position of the coordinate input pen 4 and sends coordinate data to the computer. The computer feeds back the coordinate data to the screen 102 of the rear projection display apparatus 101. In the coordinate input system, the coordinate input pen 4 can operate the computer by not only pointing the screen 102 but also performing remote control from a position separated from the screen 102.

The screen 102 of the rear projection display apparatus 101 displays window information (e.g., a window 103) generated by the computer. As described above, the operator can input coordinate data by directly touching the screen 102 with the coordinate input pen 4. He/she can also input coordinate data from a position separated from the screen 102, as shown in FIG. 1.

A virtual coordinate system (X,Y,Z) is formed at the operation position of the operator. Assume that a locus 106 is virtually drawn on a schematically defined X-Y plane 105. In this case, a line 104 corresponding to the locus 106 of the coordinate input pen 4 operated by the operator is displayed in the window 103 on the screen 102 of the rear projection display apparatus 101.

As described above, in the coordinate input system of the present invention, even when the operator is separated from the screen 102 at a meeting or the like, he/she can operate the computer or edit the display contents by remote control.

Figure 2B:
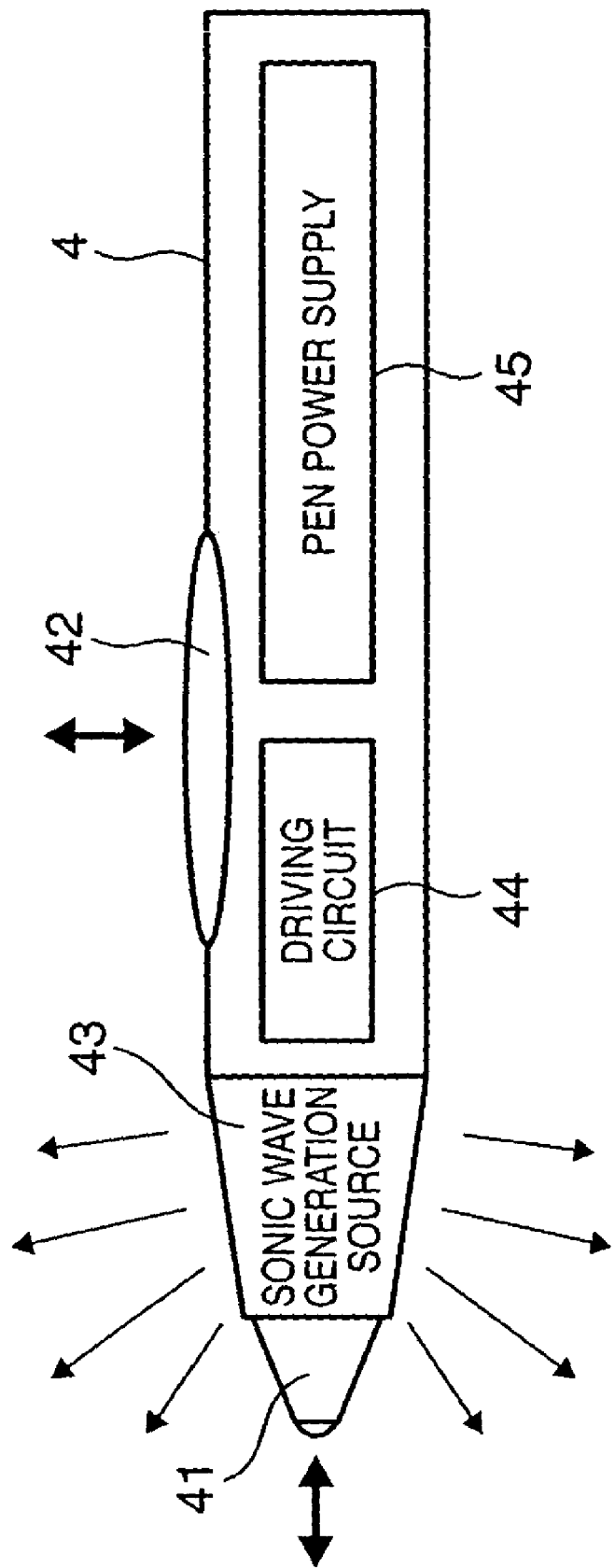
Figure 3:
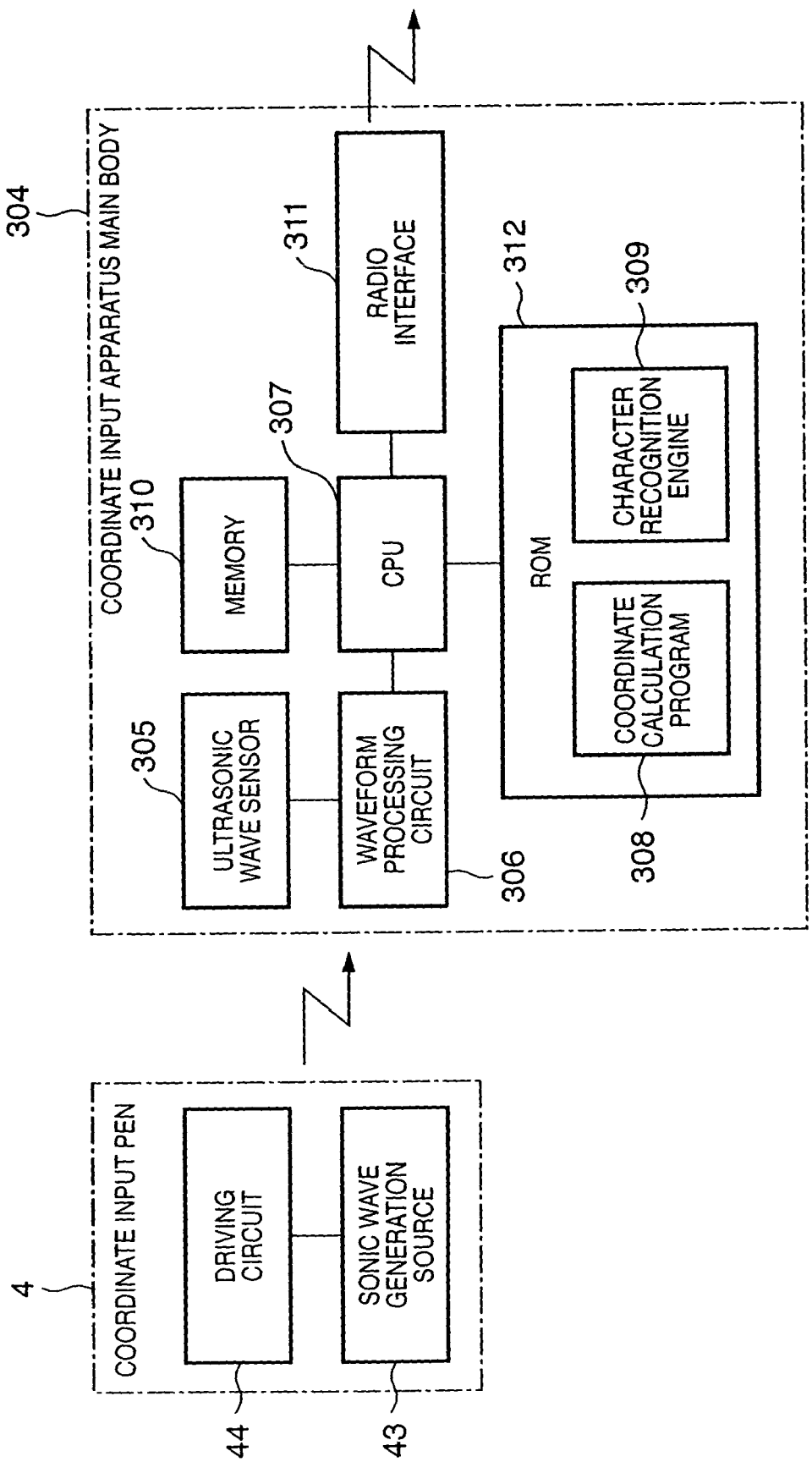
FIG. 3 is a block diagram showing the functional arrangement of the coordinate input apparatus according to the first embodiment of the present invention.

Description of Arrangement of Coordinate Input Apparatus (FIGS. 2 and 3)

As described above, when an arbitrary point on a coordinate input surface is pointed with a pen type pointing tool, a coordinate input apparatus detects the coordinates of the input point and outputs the coordinate data to a computer connected to the apparatus. In this embodiment, a case wherein an ultrasonic type coordinate input apparatus is constituted as a coordinate input apparatus will be described.

FIGS. 2A and 2B are views showing the structure of the coordinate input pen of the coordinate input apparatus according to the first embodiment of the present invention.

Especially, FIG. 2A is a view showing the outer appearance of the coordinate input pen 4. FIG. 2B is a view showing the functional arrangement of the coordinate input pen 4.

When the pen point of the coordinate input pen 4 is pressed against the screen 102, a pen point switch 41 is turned on to start oscillating an ultrasonic wave. In remote control, when a pen side switch 42a or 42b is pressed, oscillation of an ultrasonic wave starts.

More specifically, a sonic wave generation source 43 incorporated in the coordinate input pen 4 is driven by a pen power supply 45, a timer, an oscillation circuit, and a driving circuit 44 constituted by a control circuit which executes control by detecting a plurality of pieces of switch information of the coordinate input pen 4 and a memory which stores various kinds of data.

The sonic wave generation source 43 is constituted by a piezoelectric element made of, e.g., PVDF (polyvinylidene fluoride). The PVDF has an annular film shape having a predetermined size and is designed to maximize the driving efficiency at a desired frequency.

The driving signal for the sonic wave generation source 43 is a pulse signal which is generated by the timer and has a predetermined repetitive period. The pulse signal is amplified by an oscillation circuit at a predetermined gain and then applied to the sonic wave generation source 43. This electrical driving signal is converted into a mechanical vibration by the sonic wave generation source 43 so that its energy is radiated into the air.

The coordinate input pen 4 according to the first embodiment comprises the pen point switch (SW) 41 which operates when the pen point is pressed, and the plurality of pen side switches (SW) 42a and 42b arranged on the housing of the coordinate input pen 4.

The driving circuit 44 outputs the signal that drives the sonic wave generation source 43 in the coordinate input pen 4 at a predetermined period (e.g., every 10 msec; in this case, since a sonic wave is radiated 100 times per sec, the coordinate calculation sampling rate of the coordinate input apparatus is 100 times/sec) so that a sonic wave is radiated into the air.

An infrared LED 46 generates infrared light. This will be described in detail in the second embodiment.

FIG. 3 is a block diagram showing the functional arrangement of the coordinate input apparatus according to the first embodiment of the present invention.

An ultrasonic wave signal oscillated from the sonic wave generation source 43 in the coordinate input pen 4 is detected by a plurality of ultrasonic wave sensors 305 of internal circuits of a coordinate input apparatus main body 304. The detected ultrasonic wave signal is amplified to a predetermined level by a waveform processing circuit 306 and input to a CPU 307 as a detection timing signal.

When all timing signals thus detected by the plurality of ultrasonic wave sensors are received, the CPU 307 converts the time information into distance information and calculates the coordinate position of the coordinate input pen 4 on the basis of the principle of triangulation.

This coordinate calculation is executed by causing the CPU 307 to read out a coordinate calculation program 308 stored in a ROM 312. The calculated coordinate data is stored in a memory 310. The coordinate data is also sequentially transferred to an external computer through a radio interface 311. A locus obtained from the coordinate data can be subjected to character recognition by a character recognition engine 309, as needed. The recognition result can be stored in the memory 310 as a command or text data.

The coordinate input system according to the first embodiment can employ various configurations in addition to the above-described configuration. For example, the pointing tool is not limited to a pen type tool and may have a so-called pointing stick shape. The coordinate input scheme is not limited to the ultrasonic wave scheme. An infrared scheme, resistive film scheme, electromagnetic induction scheme, or electrostatic coupling scheme can also be employed.

If the coordinate input apparatus calculates not three-dimensional coordinates along the X-, Y-, and Z-axes but two-dimensional coordinates, unlike the first embodiment, the present invention can be applied to the apparatus by adding a function of calculating the distance (coordinates related to the distance) between the screen and the coordinate input apparatus, and for example, a function of measuring the distance using infrared reflected light.

The display apparatus is not limited to the rear projection display apparatus. Any other display apparatus such as a front projection display apparatus, a liquid crystal display, or a plasma display, which can display computer information, can be used.

The coordinate input apparatus 304 and external computer can be connected not by the radio interface 311 but a wired interface.

Figure 5:
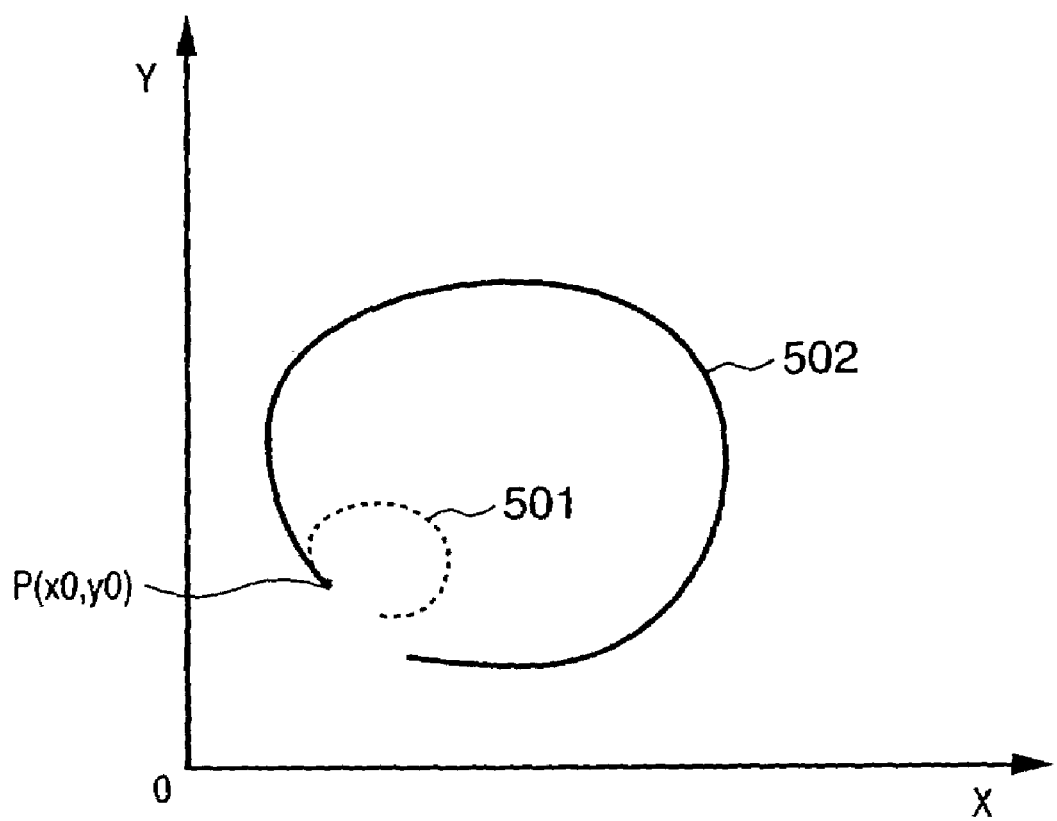
FIG. 5 is a view for explaining a coordinate system enlargement operation of the coordinate input apparatus according to the first embodiment of the present invention.

Description of Operation of Coordinate Input Apparatus (FIGS. 4 and 5)

The input method of the coordinate input apparatus according to the first embodiment will be described below on the basis of input examples by the coordinate input pen 4.

FIG. 4 is a view showing an input example in which the cursor 104 is displayed on the screen 102 according to the first embodiment of the present invention.

In this example, the operator wants to draw a line from a point A to a point B (a line is drawn by transmitting coordinate information and switch information to the computer, like when a mouse is moved while keeping the left mouse button pressed). The operation of the pen side switch 42a or 42b of the coordinate input pen 4, the state (ultrasonic wave oscillation state or stop state) of the coordinate input pen 4, and the coordinate output modes of the coordinate input apparatus will be described with reference to FIG. 4.

Referring to FIG. 4, in state 1, the cursor 104 is only displayed on the screen 102. None of the pen point switch 41 and pen side switches 42a and 42b of the coordinate input pen 4 are pressed.

In state 2, the cursor 104 is moved to the point A where drawing should start. More specifically, the pen side switch 42a is turned on to set an ultrasonic wave oscillation mode, and the cursor 104 is moved to the point A.

In state 3, the pen side switches 42a and 42b are turned on, and the cursor 104 is moved from the point A to the point B. That is, this is a drawing state. The locus of the cursor 104 is displayed on the screen 102.

In state 4, when the cursor 104 is moved to the point B while displaying the locus, the pen side switch 42b is turned off (the finger is moved off from the switch).

When coordinate information and switch information are input in this way, the computer can be operated as if the operator were using a mouse.

The switch information may be transmitted to the main body by an infrared or radio wave. Alternatively, the switch information may be detected on the main body side by changing the oscillation interval between the switches.

In remote control as shown in FIG. 1, i.e., in inputting coordinate data from a position separated from the screen 102, the three-dimensional coordinate axes X, Y, and Z as shown in FIG. 1 are defined. In this case, as the distance from the screen 102 along the Z-axis increases, the relative size of the screen 102 (the screen 102 to which the operator wants to input) viewed from the operator seems to be smaller.

However, to input X- and Y-coordinates by remote control, the operator must input a stroke equal to the moving distance of the cursor 104 on the screen 102. The operator feels as if he/she can input a small stroke. If so, however, the actual moving distance of the cursor on the screen 102 is too small. Hence, no natural sense can be felt with the input.

In addition, the display apparatus itself often has a large screen. It is not uncommon that a display apparatus has a large screen out of reach. If the stroke reflected on the screen 102 in remote control and the stroke at the input position have a 1:1 relationship, it is impossible to input coordinate data to the screen 102.

In the first embodiment, when remote control is to be performed, the X- and Y-coordinates are changed (the coordinate system is enlarged) in accordance with the distance between the coordinate input pen 4 and the Z-axis such that the stroke by the operator has a natural length.

The change of X- and Y-coordinates will be described below with reference to FIG. 5.

FIG. 5 is a view for explaining the coordinate system enlargement operation of the coordinate input apparatus according to the first embodiment of the present invention.

As shown in FIG. 5, when a graphic 502 is to be drawn on the X-Y coordinate system of the screen 102, the actual stroke drawn by the operator in the space in remote control is input as a virtual curve 501.

More specifically, the output coordinates are drawn as relative coordinates from a starting point P (x0,y0). For the output to the screen, the relative coordinates of the virtual curve 501 are multiplied by a predetermined magnification kn, and resultant coordinates are displayed on the screen 102. Accordingly, the operator can execute natural drawing even the drawing is performed by remote control at a position separated from the screen 102.

The magnification is determined in accordance with the Z-coordinate, i.e., the distance from the screen 102 to the input position of the coordinate input pen 4 by the operator. The magnification is determined by looking up a table (FIG. 13) which is set and stored in the memory 310 in advance.

The curve displayed on the screen 102, which is indicated by the relative coordinate values obtained by enlargement by the magnification kn, may be discontinuous depending on the driving interval or coordinate calculation sampling interval. When, for example, the average value with respect to relative coordinate values by the preceding coordinate calculation sampling is calculated by executing interpolation calculation and transmitted to the computer, a smooth curve can be obtained.

Description of Detailed Arrangement of Coordinate Input Apparatus

The arrangement of the coordinate input apparatus which executes the above-described operation will be described in more detail.

Figure 6:
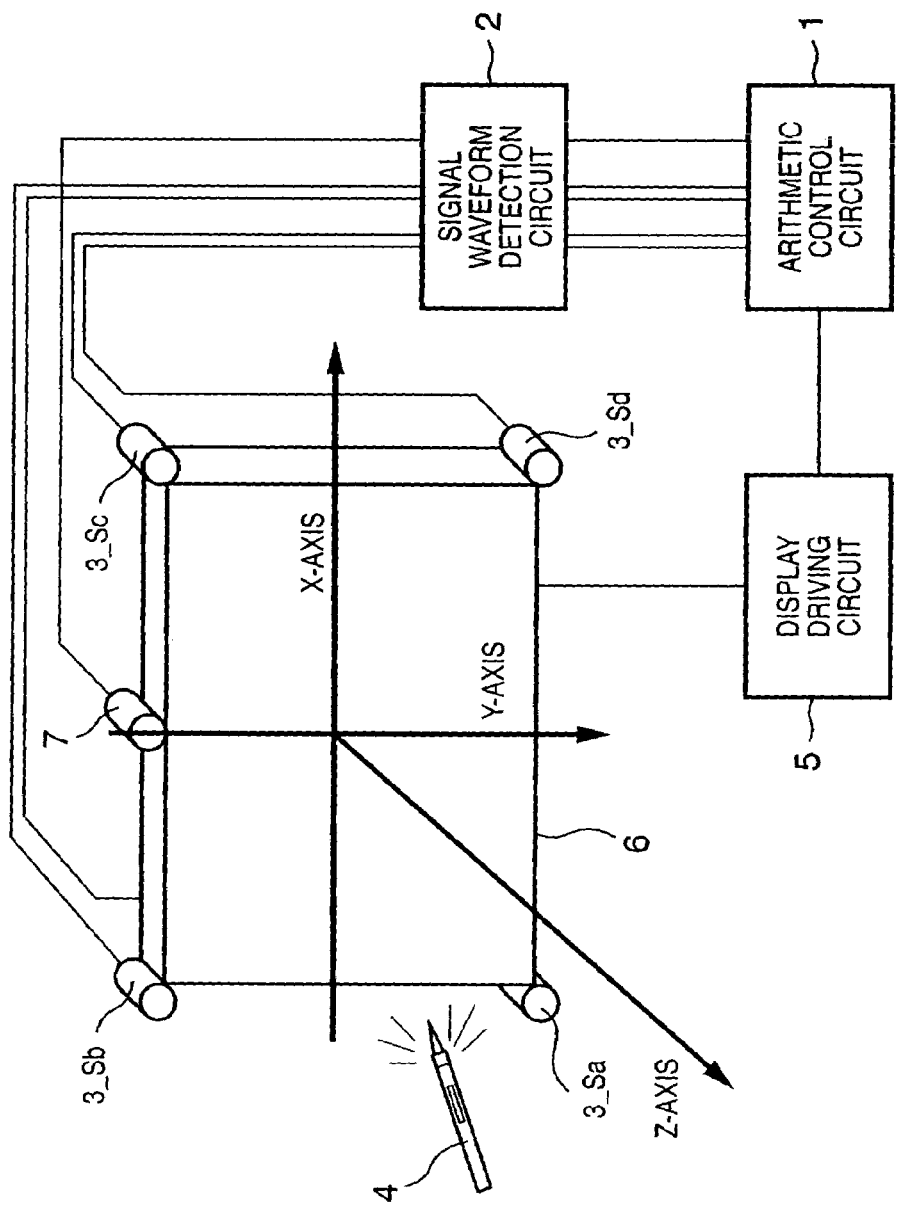
FIG. 6 is a view showing the schematic arrangement of the coordinate input apparatus according to the first embodiment of the present invention, which can measure three-dimensional (spatial) coordinates.

FIG. 6 is a view showing the schematic arrangement of the coordinate input apparatus according to the first embodiment of the present invention, which can measure three-dimensional (spatial) coordinates.

The coordinate input pen 4 serving as a pointing tool is designed to generate a sonic wave into the air in accordance with the coordinate input operation by the operator. The generated sonic wave is detected by a plurality of detection sensors 3 (in the first embodiment, four detection sensors 3_Sa to 3_Sd are used) and processed by a signal waveform detection circuit 2 by a method to be described later. Then, an arithmetic control circuit 1 calculates the position (X,Y,Z) of the sonic wave generation source of the coordinate input pen 4.

A detection sensor 7 detects infrared light. This will be described in detail in the second embodiment.

The arithmetic control circuit 1 is designed to be able to control the entire coordinate input apparatus and also move the cursor displayed on a display apparatus 6 through a display driving circuit 5 or display/add handwritten information such as notes on the display apparatus 6.

When the coordinate input apparatus and display apparatus are combined in the above way, a man-machine interface capable of realizing the relationship of "paper and a pencil" can be provided.

The sonic wave from the coordinate input pen 4, which arrives at and is detected by the sensors, has delays corresponding to the distances between the sonic wave generation source 43 and the detection sensors 3_Sa to 3_Sd. Each of the detection sensors 3_Sa to 3_Sd is formed from, e.g., a piezoelectric vibrator such as PZT which generates a thickness vibration. An acoustic matching layer is formed on the front surface. The acoustic matching layer is made of a thin layer of silicone rubber or the like. The acoustic matching layer can match the acoustic impedance to a gas, obtain a wide-band characteristic at a high sensitivity, and transmit/receive an ultrasonic wave signal with a high pulse response.

The coordinate input apparatus of this type basically derives the distance between the sonic wave generation source 43 of the coordinate input pen 4 and each of the detection sensors 3_Sa to 3_Sd on the basis of the product of the known sound velocity of the sonic wave and the arrival time of the sonic wave and geometrically obtains the position information of the sonic wave generation source 43 using the position information of each of the detection sensors 3_Sa to 3_Sd. The arrival time detection method of detecting the arrival time of the sonic wave will be described with reference to FIGS. 7 and 8.

Figure 7:
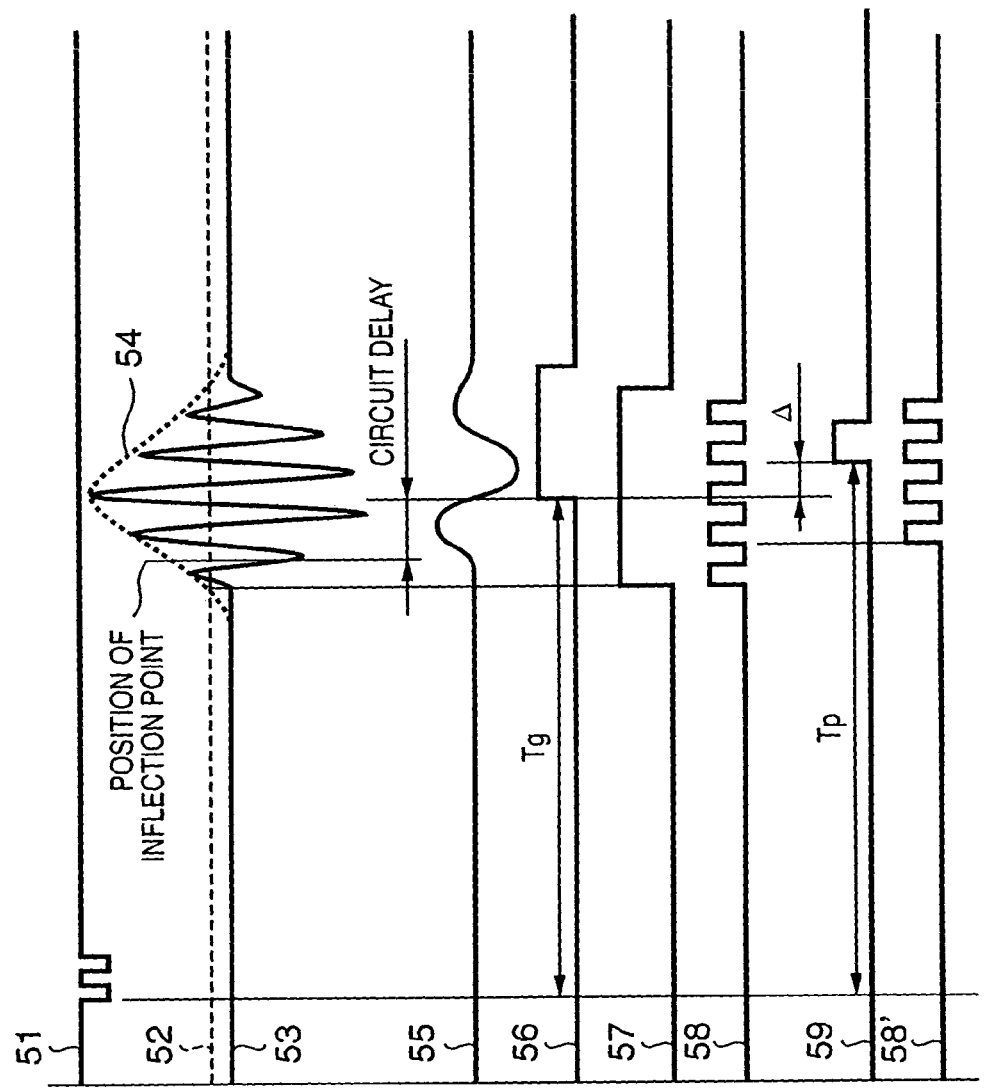
FIG. 7 is a timing chart for explaining a sonic wave arrival time detection method according to the first embodiment of the present invention.
Figure 8:
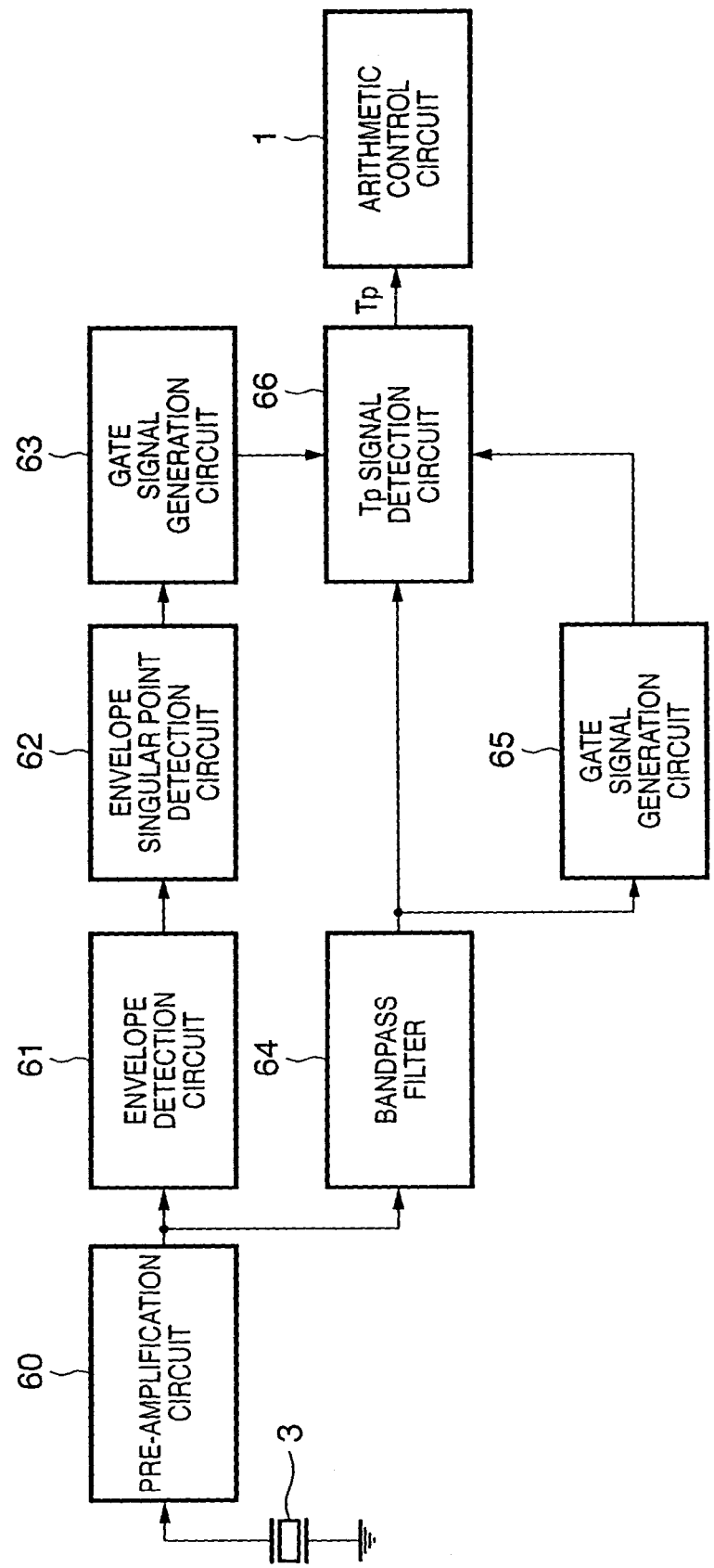
FIG. 8 is a block diagram of a detection circuit which realizes sonic wave arrival time detection according to the first embodiment of the present invention.

FIG. 7 is a timing chart for explaining a sonic wave arrival time detection method according to the first embodiment of the present invention. FIG. 8 is a block diagram of a detection circuit which realizes sonic wave arrival time detection according to the first embodiment of the present invention.

Reference numeral 51 denotes a driving signal generated by the driving circuit 44. The driving circuit 44 generates the driving signal 51 and also produces a start signal. The start signal is transmitted to the arithmetic control circuit 1 through, e.g., an infrared LED (not shown) incorporated in the coordinate input pen 4 to start a timer 12 (FIG. 9) in the arithmetic control circuit 1.

A sonic wave radiated into the air is delayed in accordance with the distances between the sonic wave generation source 43 and the detection sensors 3_Sa to 3_Sd and detected by the detection sensors 3_Sa to 3_Sd. Reference numeral 53 denotes a detection signal detected by the detection sensors 3_Sa to 3_Sd and amplified to a predetermined level by a pre-amplification circuit 60. The detection signal 53 is processed by an envelope detection circuit 61 constituted by an absolute value circuit and a low-pass filter, so only an envelope 54 of the detection signal is extracted.

The envelope 54 will be described with an emphasis. The sound velocity of propagation of the waveform is represented by a group velocity Vg. When the singular point of the envelope 54, e.g., the peak or inflection point of the envelope 54 is detected, a delay time tg related to the group velocity Vg is obtained. An envelope singular point detection circuit 62 which detects the peak or inflection point of the envelope 54 can easily detect it using a differentiation circuit and zero-crossing comparator.

In the first embodiment, second-order differentiation is executed to form a signal 55. The inflection point of the envelope 54 is detected with reference to a gate signal obtained by comparing a threshold level 52 with the detection signal 53 (signal 56). When the timer 12 which is operated by the above-described start signal is stopped using the signal 56, a group delay time Tg related to the group velocity Vg can be detected.

Strictly speaking, the group delay time Tg contains the delay component of the circuit related to waveform processing. However, its influence is completely removed by a method to be described later. For the sake of simplicity, a description will be made here assuming that no circuit delay time is present.

A distance L between the sonic wave generation source 43 and each of the detection sensors 3_Sa to 3_Sd can be obtained by $$L = Vg \times Tg \quad (1)$$

To more accurately calculate the distance L, the sonic wave arrival time is derived from the phase information of the detection signal waveform. This will be described in detail. An extra frequency component of the output signal 53 from the detection sensors 3_Sa to 3_Sd is removed by a bandpass filter 64. Then, the signal 53 is input to a Tp signal detection circuit 66.

The Tp signal detection circuit 66 is constituted by a zero-crossing comparator and multivibrator. A signal related to the zero-crossing point of the signal output from the bandpass filter 64 is compared with a gate signal 57 produced by a gate signal generation circuit 65 which compares the detection signal with the predetermined threshold level 52, thereby producing a signal 58.

Then, the signal 56 which detects the above-described group delay time Tg is referred to as a gate signal (produced by a gate signal generation circuit 63). A signal 59 which outputs the first zero-crossing point where the phase of the signal waveform output from the bandpass filter 64 crosses from, e.g., the negative side to the positive side in the period of the signal 56 is produced.

When the timer 12 which is operated by the above-described start signal is stopped using the signal 59, a phase delay time Tp related to a phase velocity Vp can be detected.

Strictly speaking, the phase delay time Tp contains the delay component of the circuit related to waveform processing. However, its influence is completely removed by a method to be described later. For the sake of simplicity, a description will be made here assuming that no circuit delay time is present.

The distance L between the sonic wave generation source 43 and each of the detection sensors 3_Sa to 3_Sd can be obtained by $$L = Vp \times Tp \quad (2)$$

The effect of use of the gate signal 56 produced by the gate signal generation circuit 63 on the basis of the envelope singular point detection circuit 62 will be described.

The signal level detected by the detection sensors 3_Sa to 3_Sd varies depending on the following factors.

1) The electromechanical conversion efficiency of the sonic wave generation source 43 and detection sensors 3_Sa to 3_Sd 2) The distances between the sonic wave generation source 43 and the detection sensors 3_Sa to 3_Sd 3) Environmental variations in temperature and humidity of the air through which the sonic wave propagates 4) The directivity of sonic wave radiation by the sonic wave generation source 43, and sensitive directivity of the detection sensors 3_Sa to 3_Sd.

Item 1) is a factor generated by component tolerance and must sufficiently be taken into consideration in mass production of apparatuses. Item 2) is related to attenuation of a sonic wave. As is generally well known, the signal level of a sonic wave that propagates through the air exponentially attenuates as the distances between the sonic wave generation source 43 and the detection sensors 3_Sa to 3_Sd increase. The attenuation constant changes depending on the environment represented by item 3).

For item 4), since the present invention operates as a coordinate input apparatus, the posture of the coordinate input pen 4 serving as a writing instrument always changes, i.e., the pen holding angle varies depending on the writing operation of the operator. The level largely changes depending on this variation. In addition, even when the angles made by the coordinate input pen 4 and the detection sensors 3_Sa to 3_Sd vary, the detection level varies because of the sensitive directivity of the detection sensors 3_Sa to 3_Sd.

For example, assume that the detection level becomes lower. In this case, since the above-descried threshold level (e.g., the signal 52) is fixed, the signal 58 may change to a signal 58' at a high probability. That is, even when the coordinate input operation is performed at the same position, the level of the detection signal 53 changes if, e.g., the holding angle (direction) of the coordinate input pen 4 changes. Hence, the generation time of the gate signal 57 depends on it. However, in the present invention, the gate signal 56 based on the singular point of the envelope 54 is referred to. For this reason, the signal 59 can stably be obtained independently of the detection signal level.

The schematic arrangement of the arithmetic control circuit 1 according to the first embodiment will be described next with reference to FIG. 9.

Figure 9:
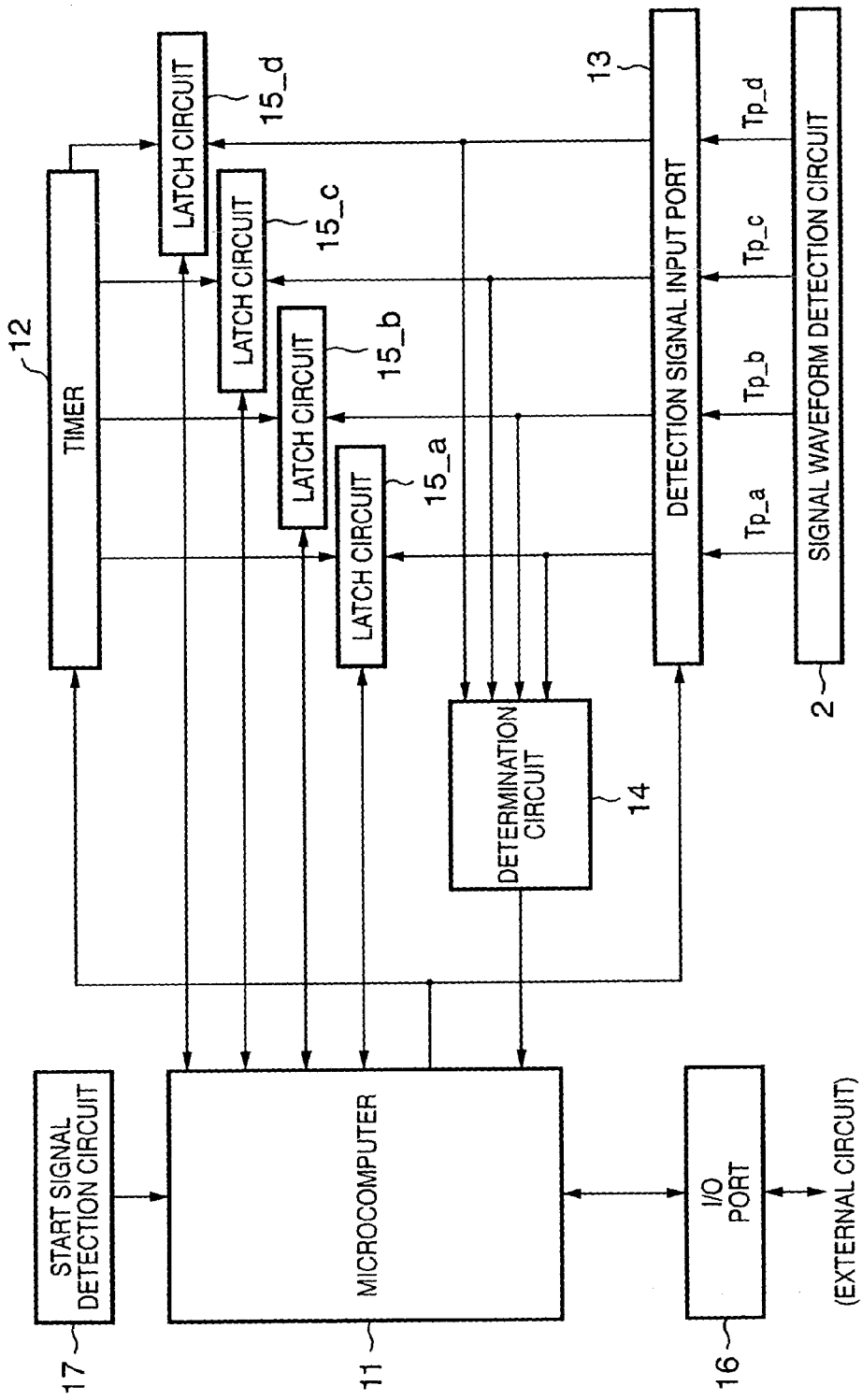
FIG. 9 is a block diagram showing the schematic arrangement of an arithmetic control circuit according to the first embodiment of the present invention.

FIG. 9 is a block diagram showing the schematic arrangement of the arithmetic control circuit 1 according to the first embodiment of the present invention.

A microcomputer 11 controls the arithmetic control circuit 1 and the entire coordinate input apparatus. The microcomputer 11 is constituted by an internal counter, a ROM which stores operation procedures, a RAM to be used for calculation and the like, and a nonvolatile memory which stores constants and the like.

As described above, a start signal which synchronizes with the driving timing of the sonic wave generation source 43 in the coordinate input pen 4 is generated by the driving circuit 44 and radiated through the infrared LED (not shown) incorporated in the coordinate input pen 4 as an optical signal. When the signal is detected by a start signal detection circuit 17, the timer 12 (constituted by, e.g., a counter) in the arithmetic control circuit 1 starts.

With this arrangement, the driving timing of the sonic wave generation source 43 in the coordinate input pen 4 can be synchronized with the timer 12 in the arithmetic control circuit 1. For this reason, the time required for the sonic wave generated by the sonic wave generation source 43 to arrive at each of the detection sensors 3_Sa to 3_Sd can be measured.

Vibration arrival timing signals (signals 59) from the detection sensors 3_Sa to 3_Sd, which are output from the signal waveform detection circuit 2, are input to latch circuits 15_a to 15_d through a detection signal input port 13. Each of the latch circuits 15_a to 15_d receives the vibration arrival timing signal from a corresponding one of the detection sensors 3_Sa to 3_Sd and latches the count value of the timer 12 at that time.

A determination circuit 14 determines that all detection signals necessary for coordinate detection have thus been received, and outputs a signal representing it to the microcomputer 11. Upon receiving the signal from the determination circuit 14, the microcomputer 11 reads the vibration arrival times to the detection sensors 3_Sa to 3_Sd from the latch circuits 15_a to 15_d, and executes predetermined calculation to obtain the coordinate position of the coordinate input pen 4.

When the calculation result is output to the display driving circuit 5 through an I/O port 16, for examples, dots can be displayed at a corresponding position on the display apparatus 6. When the coordinate position information is output to an interface circuit (not shown) through the I/O port 16, the coordinate values can be output to an external device.

A method of accurately obtaining the distance L independently of the detection signal level, as described above, will be described with reference to FIGS. 10 and 11.

The above-described arrival time detection method of detecting a sonic wave arrival time using the arrangement shown in FIGS. 7 and 8 will be defined as a first arrival time detection method. The arrival time detection method of detecting a sonic wave arrival time using the arrangement shown in FIGS. 10 and 11 will be defined as a second arrival time detection method.

The arrival time detection method will be described with reference to FIGS. 10 and 11. Reference numeral 71 denotes a driving signal generated by the driving circuit 44. The driving circuit 44 generates the driving signal 71 and also produces a start signal. The start signal is transmitted to the arithmetic control circuit 1 through, e.g., the infrared LED (not shown) incorporated in the coordinate input pen 4 to start the timer 12 in the arithmetic control circuit 1.

A sonic wave radiated into the air is delayed in accordance with the distances between the sonic wave generation source 43 and the detection sensors 3_Sa to 3_Sd and detected by the detection sensors 3_Sa to 3_Sd. Reference numeral 73 denotes a detection signal detected by the detection sensors 3_Sa to 3_Sd and amplified to a predetermined level by a pre-amplification circuit 80. The detection signal 73 is processed by an envelope detection circuit 81 constituted by an absolute value circuit and a low-pass filter, so only an envelope 74 of the detection signal is extracted.

The envelope 74 will be described with an emphasis. The sound velocity of propagation of the waveform is represented by the group velocity Vg. When the singular point of the envelope 74, e.g., the peak or inflection point of the envelope 74 is detected, the delay time tg related to the group velocity Vg is obtained. An envelope singular point detection circuit 82 which detects the peak or inflection point of the envelope 74 can easily detect it using a differentiation circuit and zero-crossing comparator.

In the first embodiment, second-order differentiation is executed to form a signal 75. The inflection point of the envelope 74 is detected with reference to a gate signal obtained by comparing a threshold level 72 with the signal 73 (signal 76). When the timer 12 which is operated by the above-described start signal is stopped using the signal 76, a group delay time Tg related to the group velocity Vg can be detected by a Tg signal detection circuit 87.

Similarly, the group delay time Tg contains the delay component of the circuit related to waveform processing.

However, for the sake of simplicity, a description will be made here assuming that no circuit delay time is present.

The distance L between the sonic wave generation source 43 and each of the detection sensors 3_Sa to 3_Sd can be obtained by equation (1).

An extra frequency component of the output signal 73 from the detection sensors 3_Sa to 3_Sd is removed by a bandpass filter 84 which has a resonance frequency with a bandwidth adapted to a plurality of frequencies oscillated by the sonic wave generation source 43. Then, the signal 73 is input to a Tp signal detection circuit 86. The Tp signal detection circuit 86 is constituted by a zero-crossing comparator and multivibrator. A signal related to the zero-crossing point of the signal output from the bandpass filter 84 is compared with a gate signal 77 produced by a gate signal generation circuit 85 which compares the detection signal with the predetermined threshold level, thereby producing a signal 78.

Then, a pulse signal 79 (Tp signal) which outputs the first zero-crossing point where the phase of the signal waveform output from the bandpass filter 84 crosses from, e.g., the negative side to the positive side in the period of the signal 76 is produced. When the timer 12 which is operated by the above-described start signal is stopped using the Tp signal 79, a phase delay time $Tp\_2$ related to the phase velocity Vp can be detected.

However, the signal 79 changes depending on the signal level of the signal 73, as described above. For example, when the signal level becomes lower, the gate signal generation position changes due to the gate signal compared with the fixed threshold value, and for example, a signal 78' is obtained. However, the difference between the phase delay time $Tp\_2$ and the Tp signal obtained by the first arrival time detection method is an integer multiple of the phase period of the detection signal waveform 73, so the two signals always have a relation given by $$Tp = Tp\_2 + n \times T \qquad (3)$$

where n is an integer, and T is the phase period of the detection signal waveform and has a known value. When equation (3) is substituted into equation (2), and equation (1) is used, we have $$n = Int[(Vg \times Tg - Vp \times Tp\_2)/\lambda p + 0.5] \qquad (4)$$

where $\lambda p$ is the wavelength of the sonic wave, which equals the product of the phase velocity Vp and a period T. Since the integer n is known, the distance L can be accurately derived using equations (2) and (3).

In the above description, the signals 56 and 59 in FIG. 7 have a time difference $\Delta$. The signals 76 and 78 in FIG. 10 also have the time difference $\Delta$. Since the group velocity Vg and phase velocity Vp of a sonic wave which propagates through the air equal, the time difference $\Delta$ has a fixed amount. Its influence is completely removed by a method to be described later, like the circuit delay, a description will be made here assuming that $\Delta=0$.

As described above, in the second arrival time detection method, the phase delay time detection point is located at an earlier point of the detection signal waveform 53 or 73 as compared to the first arrival time detection method. With this arrangement, the influence of a reflected wave can be further reduced.

Hence, in the first embodiment, to specify the detection point of the group delay time Tg, not the peak (first-order differentiation) of the envelope but an inflection point (second-order differentiation) located at an earlier point is used as a detection point. In addition, the detection point of the phase delay time is located at an earlier point of the detection signal waveform in the second arrival time detection method than in the first arrival time detection method. Hence, the above-described influence of a reflected wave can be reduced, and coordinates can be more accurately calculated.

The group delay time Tg of the second arrival time detection method is used only in equation (4) to calculate the integer n by the above-described calculation method. In addition, integer calculation (corresponding to round off) is arithmetically executed by equation (4). No influence on the calculation result is present when the error of the group delay time Tg due to the influence of the reflected wave falls within the ½ period of the phase of the detected signal waveform (within the ½ wavelength). Hence, the second arrival time detection method is excellent because the influence of the reflected wave can more effectively be removed.

However, the first arrival time detection method which can detect the sonic wave arrival time using only the phase delay time Tp is more advantageous in terms of cost than the second arrival time detection method which must detect both the group delay time Tg and the phase delay time Tp. The arrival time detection method to be employed is selected in accordance with the specifications of the target product form.

In the above-described embodiment, the detected time contains an electrical processing time by the circuits and the like in addition to the sonic wave arrival times from the sonic wave generation source 43 to the detection sensors 3_Sa to 3_Sd. A method of removing an extra measurement time other than the sonic wave propagation time will be described here.

The group delay time Tg and phase delay time Tp latched by the latch circuit contain a group circuit delay time etg and phase circuit delay time etp, respectively. Each circuit delay time always contains a constant value in every time measurement. Let t* be the time measured by a given measurement circuit in propagation between the sonic wave generation source 43 and the detection sensor 3, e be the circuit delay time in the measurement circuit, and t be the actual time necessary for the sonic wave for propagating between the sonic wave generation source 43 and the detection sensor 3. The time t* is given by $$t^* = t + e \qquad (5)$$

Let tini* be the time measurement value when the distance between the sonic wave generation source 43 and the detection sensor 3 is a known distance Lini, e be the circuit delay time in the measurement circuit, and tini be the actual sonic wave propagation time. The time tini* is given by $$tini^* = tini + e \qquad (6)$$

Hence, $$t^* - tini^* = t - tini \qquad (7)$$

Letting V be the sound velocity of the sonic wave, we obtain $$V \times (t^* - tini^*) = V \times (t - tini) \qquad (8)$$

$$= V \times t - Lini$$

Hence, the arbitrary to-be-calculated distance L between the sonic wave generation source 43 and the detection sensor 3 is given by $$L = V \times t = V \times (t^* - tini^*) + Lini \quad (9)$$

When the above-described known distance Lini and the time measurement value tini* for that distance (a phase delay time Tpini* in the first arrival time detection method or a group delay time Tgini* and phase delay time Tpini* in the second arrival time detection method) are stored in a storage medium such as a nonvolatile memory in the arithmetic control circuit 1 at the time of shipping or reset, an arbitrary distance between the sonic wave generation source 43 and the detection sensor 3 can be accurately calculated.

Figure 10:
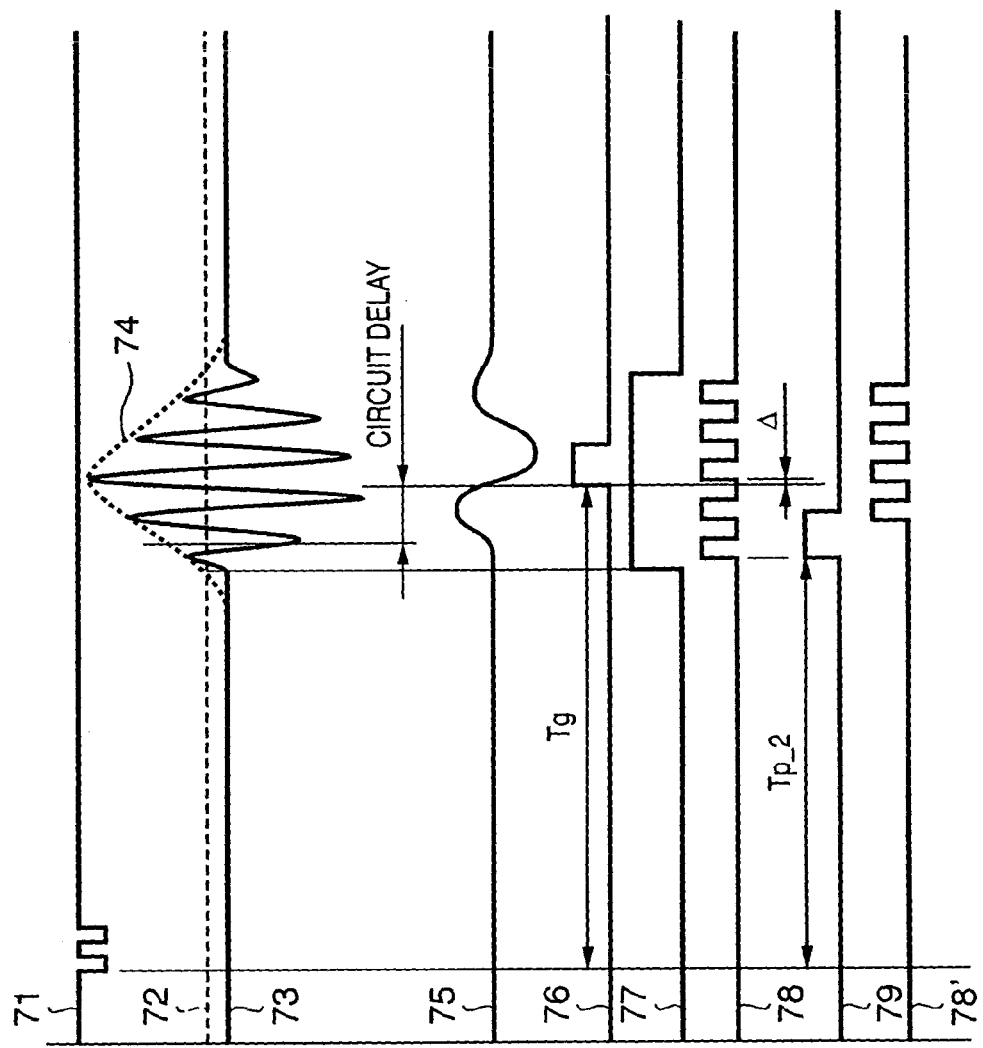
FIG. 10 is a timing chart for explaining another sonic wave arrival time detection method according to the first embodiment of the present invention.
Figure 11:
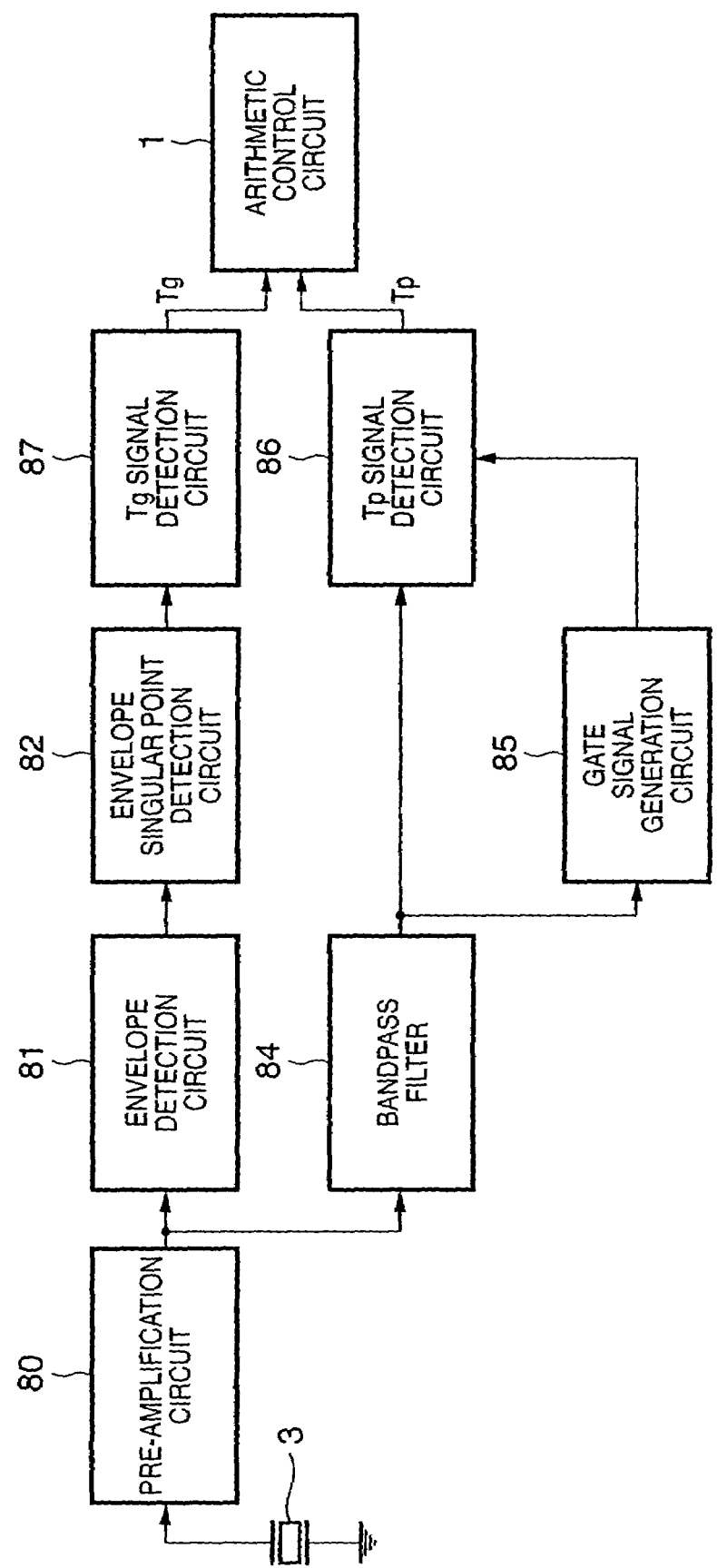
FIG. 11 is a block diagram of a detection circuit which realizes another sonic wave arrival time detection according to the first embodiment of the present invention.

As described above, the time difference Δ between the signals 56 and 59 in FIG. 7 or between the signals 76 and 78 in FIG. 10 has a fixed amount (the group velocity Vg and phase velocity Vp of a sonic wave which propagates through the air generally equal). Hence, its influence can also be removed by the above method.

A method of obtaining the position coordinates (X,Y,Z) of the sonic wave generation source 43 when the detection sensors 3_Sa to 3_Sd are arranged in the coordinate system as shown in FIG. 12 will be described next.

Let La to Ld be the distances between the sonic wave generation source 43 and the detection sensors 3_Sa to 3_Sd, which are accurately obtained by the above method, Xs-s be the distance between the detection sensors in the X direction, and Ys-s be the distance between the detection sensors in the Y direction. Then, $$Lb^2 - \left(\frac{Xs-s}{2} + x\right)^2 = Lc^2 - \left(\frac{Xs-s}{2} - x\right)^2 \quad (10)$$

$$x = \frac{Lb^2 - Lc^2}{2Xs-s} \quad (11)$$

Similarly, $$y = \frac{Lb^2 - La^2}{2Ys-s} \quad (12)$$

$$z = \sqrt{Lb^2 - \left(\frac{Xs-s}{2} + x\right)^2 - \left(\frac{Ys-s}{2} + y\right)^2} \quad (13)$$

As described above, when the distances between at least three detection sensors 3 and the sonic wave generation source 43 are measured, the position (spatial) coordinates of the sonic wave generation source 43 can easily be obtained. In the present invention, four detection sensors 3 are used. For example, the distance information of the farthest detection sensor is not used (in this case, the signal output from the detection sensor 3 has the lowest signal level because the distance is largest). Coordinates are calculated using only the remaining three pieces of distance information, thereby reliably calculating the coordinates.

When the distance information of the farthest detection sensor is used, it can be determined whether the reliability of the output coordinate values is high.

As a detailed method, for example, the coordinate values calculated using the pieces of distance information La, Lb, and Lc are equal to the coordinate values calculated using the pieces of distance information Lb, Lc, and Ld (calculation is done while changing the combination of distance information). If the coordinate values do not coincide, any of the pieces of distance information is incorrect. That is, a detection error has occurred. In this case, the reliability may be increased by inhibiting output of the coordinate values.

The operation modes of the coordinate input apparatus of the present invention, which can calculate the spatial coordinates, will be described next.

The coordinate input pen 4 according to the present invention comprises the pen point switch 41 and the two pen side SWs 42a and 42b, as shown in FIG. 2A. The operation modes of the SWs will be described with reference to FIGS. 13 and 14. In addition, the operation modes on the detection circuit side (main body side) corresponding to the operation modes of the coordinate input pen 4 will be described with reference to FIGS. 13 and 15.

Figure 14:
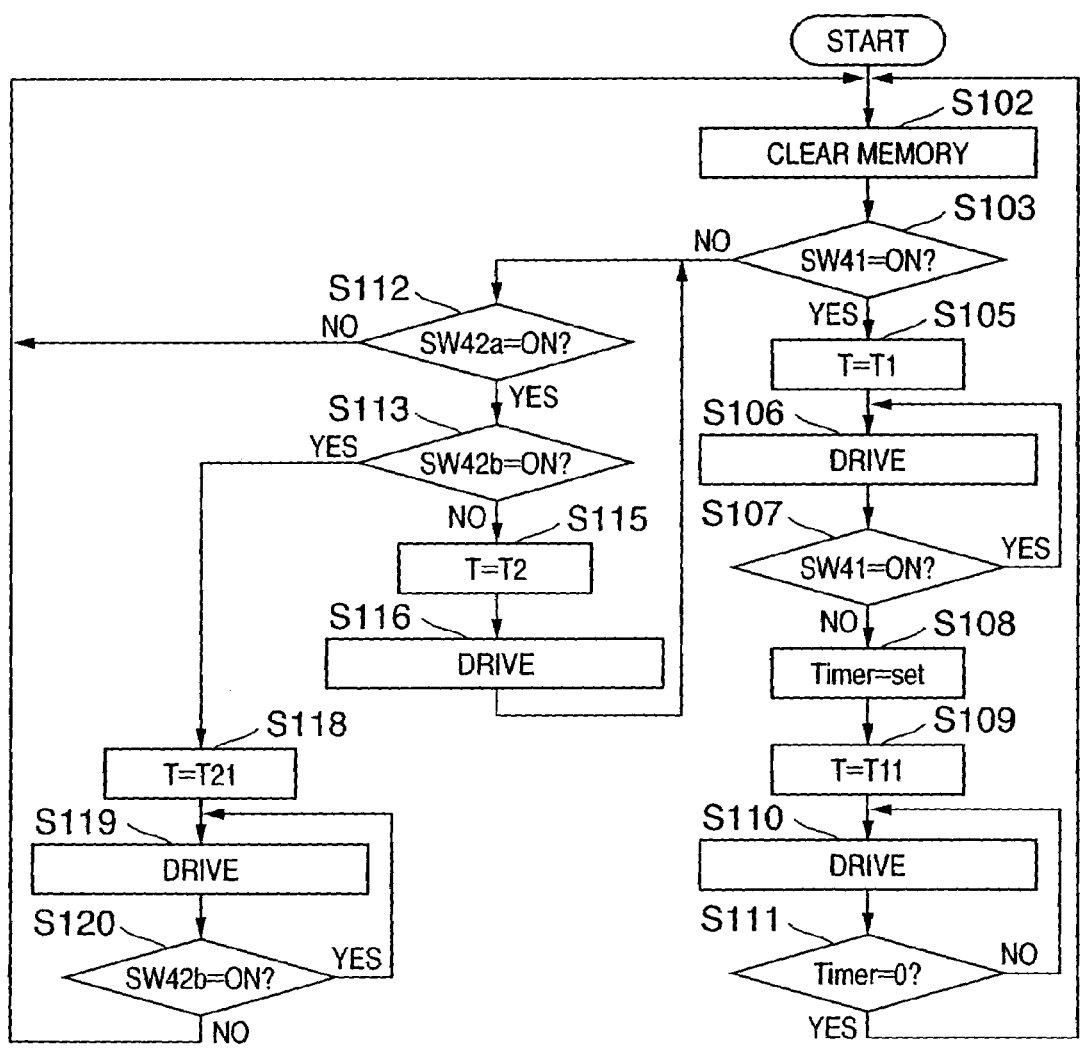
FIG. 14 is a flow chart for explaining the operation of the coordinate input pen according to the first embodiment of the present invention.

An operation program which executes processing shown in FIG. 14 is stored in the memory in the driving circuit 44 shown in FIG. 2B. The control circuit (CPU) in the driving circuit 44 executes the operation program in accordance with the operations of the pen point SW 41 and pen side SWs 42a and 42b.

When the operator holds the coordinate input pen 4 and presses the coordinate input surface (in this case, the X-Y plane (Z=0) is set on the screen surface of the display apparatus 6, as shown in FIG. 12), the pen point SW 41 operates.

In the following description, input by the operation of the pen point SW 41 will be referred to as "pen input". Coordinate input operation which is performed relatively near the display apparatus 6 when the pen point SW 41 is not in a direct contact with the surface of the display apparatus 6 and does not operate will be referred to as "proximity input". Coordinate input operation which is performed at a position separated from the display apparatus 6 will be referred to as "remote input".

First, in step S102, memory clear is executed to initialize various kinds of data stored in the memory. In step S103, it is determined whether the pen point SW 41 is ON. This determination is done on the basis of whether the operator is holding the coordinate input pen 4 and pressing the coordinate input surface (the X-Y plane (Z=0) is set on the screen surface of the display apparatus 6).

If the pen point SW 41 is not ON in step S103 (NO in step S103), the flow advances to step S112. If the pen point SW 41 is ON (YES in step S103), the flow advances to step S105 to set driving interval T=T1 (e.g., 100 times/sec). In step S106, the sonic wave generation source 43 is operated by the driving circuit 44 at the set driving frequency and driving interval such that a sonic wave is radiated into the air. The operation at this time is the pen input mode (Mode=1) in FIG. 13.

In step S107, operation of detecting the state of the pen point SW 41 is executed to determine whether the pen point SW 41 is ON. If the pen point SW 41 is ON (YES in step S107), it is regarded that the operator is continuing the writing operation, and the operation of driving the sonic wave generation source 43 in step S106 is repeated. If the pen point SW 41 is not ON (NO in step S107), i.e., when the operator separates the coordinate input pen 4 from the coordinate input surface, the flow advances to step S108.

In step S108, a predetermined time (e.g., 10 sec) is set in the timer. In step S109, driving interval T=T11 (e.g., 50 times/sec) is set. In step S110, the sonic wave generation source 43 is operated by the driving circuit 44 at the set driving frequency and driving interval.

In step S111, it is determined whether the timer is 0 (Timer=0). If the timer is not 0 (NO in step S111), the operation in steps S110 and S111 is repeated until the timer becomes 0. The operation mode at this time is the proximity input mode (Mode=2) shown in FIG. 13. The operation mode shifts to this proximity input mode when the pen point SW 41 changes from the ON state to the OFF state. If the timer is 0 (YES in step S111), the flow returns to step S102.

In remote input wherein the operation is performed at a position separated from the coordinate input surface (e.g., at a position separated from the screen by 400 mm or more), relative coordinate calculation is used in which the differential values between the preceding coordinate values and the current coordinate values are calculated. Hence, the operator first moves the cursor currently displayed on the screen to a desired input position (so-called mouse drag) and clicks on an icon or performs drawing operation (so-called click on the left mouse button).

Especially in the first embodiment, the cursor is moved by pressing the pen side SW 42a shown in FIG. 2A. Simultaneously, the pen side SW 42b is pressed to realize click on an icon or drawing operation.

If the pen point SW 41 is not ON in step S103 (NO in step S103), the flow advances to step S112 to determine whether the pen side SW 42a is ON. If the pen side SW 42a is not ON (NO in step S112), the flow returns to step S102. If the pen side SW 42a is ON (YES in step S112), i.e., when the operator is operating at a position separated from the coordinate input surface, the flow advances to step S113.

In step S113, it is determined whether the pen side SW 42b is ON. If the pen side SW 42b is ON (YES in step S113), the flow advances to step S118. If the pen side SW 42b is not ON (NO in step S113), the flow advances to step S115. In steps S112 and S113, it is determined whether the remote input 1 mode (Mode=3) or remote input 2 mode (Mode=4) in FIG. 13 is set.

When the pen side SW 42a is ON, and the pen side SW 42b is OFF, it is regarded that the remote input 1 mode (Mode=3) is set. In step S115, driving interval T=T2 (e.g., 30 times/sec) is set. In step S116, the sonic wave generation source 43 is operated by the driving circuit 44 at the set driving frequency and driving interval. The flow returns to step S112.

On the other hand, when the pen side SW 42a is ON, and the pen side SW 42b is ON, it is regarded that the remote input 2 mode (Mode=4) is set. In step S118, driving interval T=T21 (e.g., 40 times/sec) is set. In step S119, the sonic wave generation source 43 is operated by the driving circuit 44 at the set driving frequency and driving interval.

In step S120, operation of detecting the state of the pen side SW 42b is executed to determine whether the pen side SW 42b is ON. If the pen side SW 42b is ON (YES in step S120), it is regarded that the remote input 2 mode is continuously set, and the operation of driving the sonic wave generation source 43 in step S119 is repeated. If the pen side SW 42b is not ON (NO in step S120), the flow returns to step S102.

When the driving intervals T in the respective operation modes (Mode=1 to 4) satisfy driving interval: T1<T11<T21<T2, an efficient coordinate input apparatus can be constituted.

More specifically, the driving interval is set in consideration of the speed of input by the operator, which decreases in an order of the pen input mode (Mode=1), proximity input mode (Mode=2), remote input 2 mode (Mode=4), and remote input 1 mode (Mode=3). In this case, the power consumption of the coordinate input pen 4 can be suppressed, resulting in an advantage in service life of the power supply.

Figure 15:
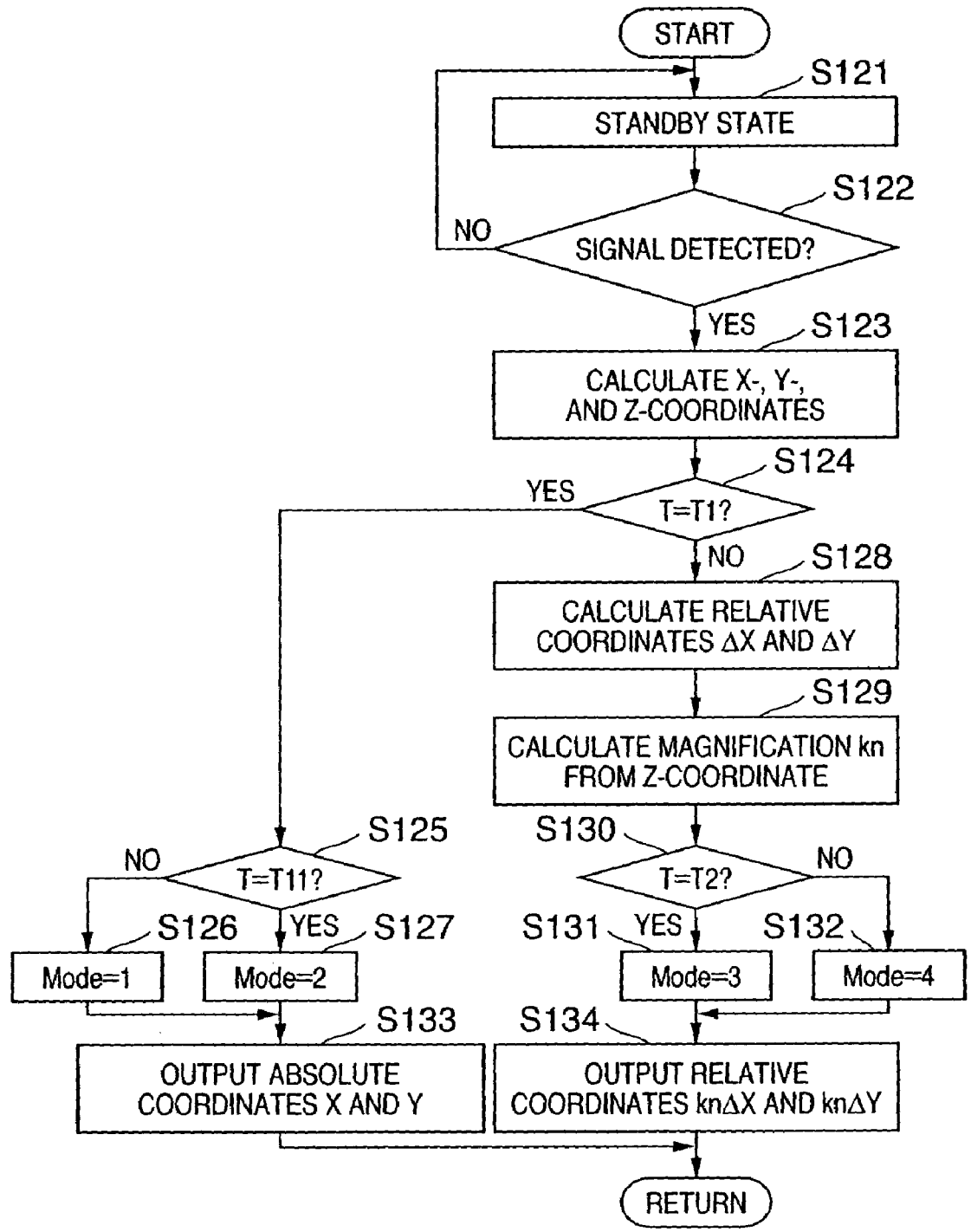
FIG. 15 is a flow chart for explaining the operation of the coordinate input apparatus according to the first embodiment of the present invention.

The operation on the detection circuit side (main body side) will be described next. Referring to FIG. 15, from the standby state in step S121, it is determined in step S122 whether the detection sensor 3 detects a signal from the coordinate input pen 4. If no signal is detected (NO in step S122), the flow returns to step S121. If a signal is detected (YES in step S122), the flow advances to step S123 to calculate the position coordinate values (X,Y,Z) of the coordinate input pen 4.

Next, in step S124, it is determined whether driving interval T=T1. If T≠T1 (NO in step S124), the flow advances to step S128. If T=T1 (YES in step S124), the flow advances to step S125 to determine whether driving interval T=T11.

If T≠T11 (NO in step S125), the flow advances to step S126 to set Mode=1 and execute the operation of the pen input mode. If T=T11 (YES in step S125), the flow advances to step S127 to set Mode=2 and execute the operation of the proximity input mode.

In step S133, the absolute coordinate values (X,Y) are output.

If T≠T1 in step S124, the differential values (relative coordinates) (ΔX,ΔY) from the coordinate values X and Y calculated by preceding coordinate calculation sampling are calculated. In step S129, the magnification kn corresponding to the relative coordinates is calculated from the table (FIG. 13) stored in the memory on the basis of the Z-coordinate value calculated in step S123.

In step S130, it is determined whether driving interval T=T2. If T=T2 (YES in step S130), the flow advances to step S131 to set Mode=3 and execute the operation of the remote input 1 mode. If T≠T2 (NO in step S130), the flow advances to step S132 to set Mode=4 and execute the operation of the remote input 2 mode.

In step S134, relative coordinate values (knΔX,knΔY) are output.

The operation modes and position coordinate output forms based on the operation modes will be described. When the pen point SW 41 is ON, the pen input mode (Mode=1) is set. Calculated coordinate values are absolute coordinate values (X,Y, 0). When the values are directly output to an external device, the operator can perform writing operation.

The OFF state of the pen point SW 41 means at least that coordinate input on the X-Y plane (Z=0) by the operator is not executed. Even in this case, it is preferably possible to execute operation of, e.g., moving the cursor displayed on the screen.

For this purpose, the proximity input mode (Mode=2) is prepared. Hence, when the pen point SW 41 changes from the ON state to the OFF state, coordinates can be input even when the pen point SW 41 is not pressed against the coordinate input surface (even when the pen point SW 41 is not in the ON state).

The coordinate input apparatus of the first embodiment can input at a position separated from the coordinate input surface (X-Y plane) (i.e., Z>0). When the pen side SW 42a is pressed, the remote input 1 mode (Mode=3) is set. When the pen side SWs 42a and 42b are simultaneously pressed, the remote input 2 mode (Mode=4) is set. In these modes, the cursor can be moved by moving the coordinate input pen 4, and the moving state can be left as a record (handscript).

As described above, according to the first embodiment, the operator can smoothly move the cursor from the current position to a desired position in the remote input mode. While coordinate input is executed continuously, the X- and Y-direction moving amounts of the coordinate input pen 4 are output by changing the coordinate values relative to the cursor moving amounts in accordance with the distance from the screen. Hence, the operability can be increased. In addition, character input and graphic drawing become possible.

Second Embodiment

In the conventional coordinate input apparatus of a resistive film type or electrostatic type, it is difficult to form a completely transparent input plate, and therefore, the image quality on the display apparatus is low.

In an apparatus of an ultrasonic wave scheme which calculates coordinates by propagating an ultrasonic wave to a propagation medium such as a glass plate, the glass surface must be optically processed to prevent, e.g., glare of a fluorescent lamp for indoor use. Hence, if the image quality should be maintained, the cost inevitably largely increases.

In an apparatus of an electromagnetic induction type, an electrode on a matrix is arranged on the lower side of the display screen to transmit/receive an electromagnetic signal to/from an input pen. For this reason, when the display apparatus becomes bulky and thick, coordinate calculation is difficult in principle. Additionally, a large-scale coordinate input apparatus for the purpose of conference or presentation is very expensive.

Since a large display system is employed assuming simultaneous watching by a large audience, a sufficient image view angle and contrast are required. Hence, when such a large display system and coordinate input apparatus are combined, it is important to make it possible to accurately calculate coordinates at a sufficiently low cost and prevent any degradation in image quality of the display apparatus.

When a large input/output integrated system of this type, and briefings assuming many participants or the age of networking are taken into consideration, it is preferable that, e.g., a questioner be able to operate the screen from his/her position by remote control (operate the screen at a position separated from the display) or obtain information from the network, as needed, in addition to control of a terminal such as a personal computer by causing an operator to directly touch the screen.

As described above, actual system use forms by an operator can roughly be classified into three states: a pen input state wherein the operator directly touches the input surface on the display to leave a handscript or execute various kinds of operations, a proximity input state wherein the pointing tool is operated near the input surface on the display to move the cursor or the like, and a remote input state wherein the pointing tool is operated at a position separated from the display.

In the pen input state, it is important as specifications that the handscript is faithfully reproduced as the operator moves the pointing tool. In the proximity input mode as well, the distance between the display as the display screen and the pointing tool is short. It is required to, e.g., faithfully move the cursor displayed on the display when the pointing tool is moved.

In the remote input mode, however, considerably different specifications are required. A description will be made assuming, e.g., presentation in a conference room or conference hall using a laser pointer. First, the operator intuitively holds the direction of the laser pointer and irradiates the display screen with a laser beam to indicate a desired point. Normally, however, the first laser irradiation position is considerably shifted from the operator's desired position.

Hence, the operator can correct the direction of the laser beam while checking the position of the laser beam with which the screen is irradiated, thereby attaining the object. In other words, if this feedback loop (visual recognition→correction of direction→visual recognition) is not present, it is difficult to indicate the predetermined position by remote control.

In remote control, the operator may sometimes operate the pointer while looking at the screen obliquely.

More specifically, the display screen of the display is defined as an X-Y plane, the direction of the normal to the X-Y plane is defined as the Z-axis, and the origin is set at the central point of the display screen of the display. Then, the range of the display screen is represented by $X \leq |Xs-s/2|$, $Y \leq |YS-s/2|$, and $Z=0$ (FIG. 12). However, the pointing tool of the operator is located in the oblique direction from the display. The pointing tool is not always located within the range represented by $X \leq |Xs-s/2|$, $Y \leq |Ys-s/2|$, and $Z=0$.

That is, the pointing tool can often be located outside the space formed by projecting the display screen in the Z-axis direction. In the pen input mode or proximity input mode, the X- and Y-coordinate detection area can almost correspond to the size of the display screen of the display apparatus. However, when the remote control state is taken into consideration, the coordinate detection area size must be larger, and an absolute accuracy must be guaranteed.

In the pen input state or proximity input state, for example, if the cursor should be moved for a long distance diagonally from a corner to another corner on a wide-screen display, the object is attained by moving not only the hand but also the human body itself (including, e.g., walking or changing the posture). Such movement is almost allowable as human operation in handwriting on a whiteboard or the like. In the remove control, however, predetermined handwriting is required on the spot. A predetermined operation must be executed without moving the human body.

To implement these operations, the coordinate input pen must have a plurality of switch means. Operation assignment to the switch means must be sufficiently taken into consideration. For example, depending on whether the operator is a right-hander or left-hander, a dedicated pointing tool needs to be prepared or a mechanism that allows the operator himself/herself to change the operation assignment to the switch means must be prepared. This decreases the convenience and operability because of the cumbersomeness of the operation or increases the cost of the apparatus.

In the second embodiment, a coordinate input apparatus will be described, which provides a coordinate input pen which has good operability independently of the operator's dominant hand, and implements a pen input state wherein character information or the like is input by pressing the coordinate input pen against the input surface, and a proximity input state and remote control input state wherein the same operation as in the pen input state can be performed at a position separated from the input surface while greatly increasing the operability.

A coordinate input apparatus according to the second embodiment is designed to cause a coordinate input pen 4 shown in FIG. 6 of the first embodiment to generate a sonic wave into the air in accordance with operator's coordinate input operation and also radiate infrared light to transmit an ultrasonic wave radiation timing or switch information of the coordinate input pen 4.

The radiated infrared light is received by a photosensor 7, and the simultaneously radiated sonic wave is detected by a plurality of detection sensors 3 and processed by a signal waveform detection circuit 2. Then, the position (X,Y,Z) of the sonic wave generation source of the coordinate input pen 4 is calculated by an arithmetic control circuit 1.

In the present invention, the scheme of detecting the position coordinates of the coordinate input pen 4 serving as a writing instrument on the basis of the ultrasonic wave transmission time is described. The present invention can be practiced for a coordinate input apparatus capable of three-dimensional (spatial) coordinate measurement. The coordinate calculation Principle (e.g., a coordinate input apparatus which can execute three-dimensional measurement by an optical method) is not limited.

In the coordinate input pen 4 according to the second embodiment, when a mechanical vibration energy is radiated from a sonic wave generation source 43, an optical signal is radiated through an infrared LED 46 in synchronism with the timing of vibration energy radiation.

Although not illustrated in FIG. 2A, in the second embodiment, pen side SWs 42a and 42b arranged on the surface of the housing of the coordinate input pen 4 are arranged to be adjacent to each other in parallel to the axis of the housing.

When a pen point SW 41 or one of the plurality of pen side SWs 42a and 42b of the coordinate input pen 4 is turned on, both an ultrasonic wave signal and an optical signal are radiated at a predetermined period. The optical signal is synchronized with the ultrasonic wave radiation timing. The arithmetic control circuit 1 detects the ultrasonic wave radiation timing through a photosensor 75 and calculates the position coordinates of the coordinate input pen 4 as the sonic wave generation source. A signal representing the state (e.g., which switch is ON, or a code that identifies the pen) of the coordinate input pen 4 is multiplexed with the optical signal.

A method of transmitting the information will be described. For example, a header portion including a leader portion formed from a continuous pulse train and a code (maker ID or the like) following the leader portion is output first. Then, pieces of information of a transmission data row including the pen ID and control signals such as the above-described pen switch signal are sequentially output in accordance with an order and format defined in advance. This method is well known (e.g., a remote controller using infrared light), and a detailed description thereof will be omitted here.

Figure 17:
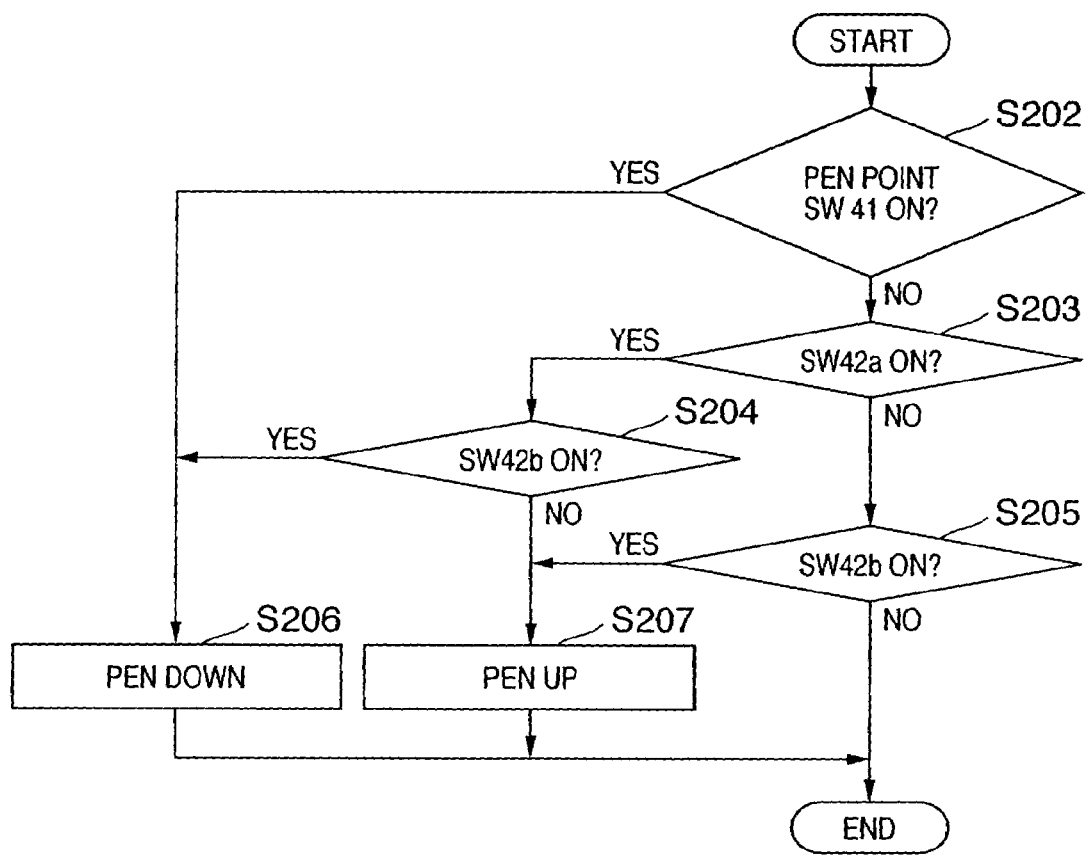
FIG. 17 is a flow chart for explaining the operation of the coordinate input pen according to the second embodiment of the present invention.

The operation modes of the SWs of the coordinate input pen 4 will be described next with reference to FIGS. 16 and 17.

When the operator holds the coordinate input pen 4 and presses the coordinate input surface (in this case, the X-Y plane (Z=0) is set on the screen surface of a display apparatus 6, as shown in FIG. 12), the pen point SW 41 operates. First, in step S202, it is determined whether the pen point SW 41 is ON.

If the pen point SW 41 is not ON (NO in step S202), the flow advances to step S203. If the pen point SW 41 is ON (YES in step S202), the flow advances to step S206 to cause a driving circuit 44 to operate the sonic wave generation source 43 at a first predetermined period (e.g., 50 times/sec) such that a sonic wave (first control signal) is radiated into the air at the first predetermined period.

The coordinate values calculated by the coordinate input apparatus of the present invention at this time are absolute coordinate values (X,Y, 0). When the values are directly output to an external device or the like, the operator can perform writing operation (pen down state).

The ON state of the pen point SW 41 means a state (pen down state) wherein the coordinate input pen 4 is located on the display apparatus 6 as the coordinate input surface, and the operator is going to execute coordinate input to input a handscript. A handscript is displayed on the screen faithfully in accordance with the handwriting operation of the operator.

For example, when the pen point SW 41 is operated twice in a predetermined time, mouse double click operation is recognized by monitoring the time or interval of signal reception or the coordinate calculation timing while referring to the coordinate calculation sampling rate of the coordinate input apparatus.

On the other hand, when the pen point SW 41 is not ON (NO in step S202), i.e., when the pen point SW 41 is OFF, it means at least a state wherein coordinate input on the X-Y plane (Z=0) by the operator is not executed. Even in this case, it is preferably possible to execute operation of, e.g., moving the cursor displayed on the screen (pen up state). To implement this operation, the coordinate input pen 4 of the present invention has the pen side SWs 42a and 42b.

In steps S203 to S205, it is determined whether the pen side SW 42a or 42b is ON. On the basis of the determination result, when at least one of the pen side SWs is ON, the flow advances to step S207 to radiate a sonic wave (second control signal) into the air at a second predetermined period (e.g., 40 times/sec) (pen up state).

Even at a position separated from the coordinate input surface, if the operator wants to move the cursor by moving the coordinate input pen 4 and leave the moving state as a record (handscript), he/she presses both the pen side SWs 42a and 42b. Then, the flow advances to step S207 to radiate a sonic wave (first control signal) into the air at the first predetermined period to set the pen down state.

The detailed use examples assuming that the pen point SW 41 is in the OFF state, and at least one of the pen side SWs 42a and 42b is in the operative state correspond to a case wherein the operator is going to control the screen at a position separated from the display apparatus 6 as the coordinate input surface, and for example, a case wherein the operator is to move the cursor to a desired position from a remote spot or input a handscript.

That is, when at least one of the pen side SWs 42a and 42b is operating, the operator can realize the state (pen up state) wherein the cursor displayed on the screen can be moved. When both of the pen side SWs 42a and 42b are operating, a state (pen down state) wherein the movement of the cursor can be left as a handscript can be realized.

That is, the coordinate input apparatus is designed to be able to output the state of the pen (pen up state or pen down state) as information simultaneously when coordinates are output. Hence, a desired operation can be implemented on the basis of the information by control software or application software stored in an external device such as a personal computer.

The discrimination between "at least one pen side switch" and "both pen side switches" is done in consideration of the dominant hand. Especially in the second embodiment, as described above, the pen side SWs 42a and 42b of the coordinate input pen 4 are arranged to be adjacent to each other symmetrically with respect to the axis of eth coordinate input pen 4. Hence, the same effect can be obtained by the same operation independently of whether the operator is a right-hander or left-hander.

As another embodiment of the pen side SWs 42a and 42b, when a two-stroke switch, i.e., a switch whose second switch is operated by pressing the key top of the switch is used, the same effect as described above can be obtained.

Figure 18:
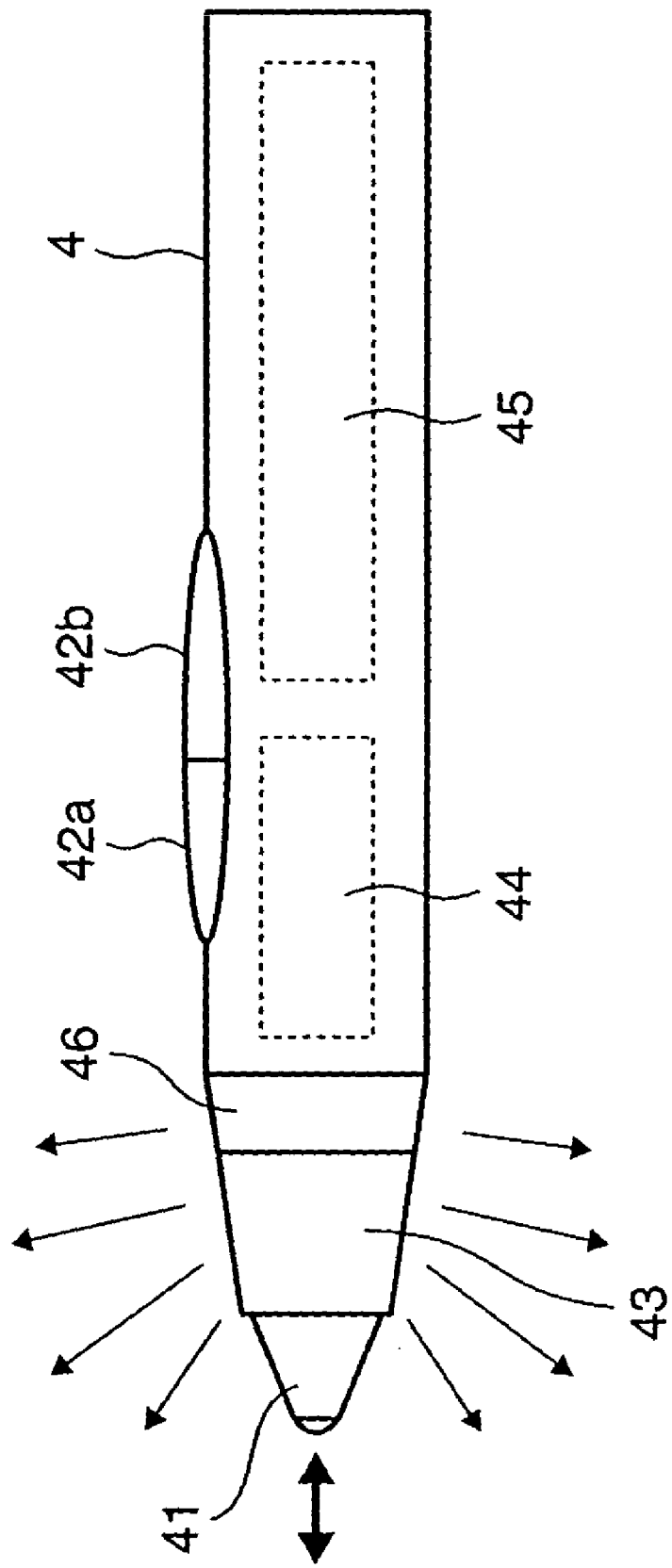
FIG. 18 is a view showing the structure of another coordinate input pen according to the second embodiment of the present invention.

As shown in FIG. 18, when the pen side SWs 42a and 42b are arranged to be adjacent along the axis of the housing of the coordinate input pen 4, the effect as described above can be obtained.

In addition, the operations are assigned to the pen side SWs 42a and 42b such that the state, "at least one pen side switch" or "both pen side switches" functions. Since the degree of freedom of switch operation for attaining the object increases in association with specifications unique to the size of the operator's hand or the like, the operability increases independently of the individual variation between operators.

When three pen side switches are arranged on the housing to add another control signal in addition to the above-described operations, the effect as described above can be obtained by assigning control signals for operations corresponding to states "one of the three pen side switches", "two of the three pen side switches", and "all the three pen side switches" to the switch means.

As described above, the state wherein the pen point SW 41 is in the OFF state, and at least one of the pen side SWs 42a and 42b is in the operative state corresponds to a case (remote input state) wherein the operator is going to control the screen at a position separated from the display apparatus 6 as the coordinate input surface.

The "remote input" will be examined. Even when remote control is performed at a position separated from the screen as the display screen, a desired position can intuitively input as the distance becomes short (when the distance is 0, the pen point SW 41 is pressed and set in the operative state, so the pen input state is set).

Inversely, as the distance between the operator and the screen increases, the shift between the operator's desired position to be indicated and the position of the displayed cursor becomes large. The reason for it can easily be understood by assuming presentation using a laser pointer.

More specifically, when the operator indicates a predetermined point from a remote spot by using a laser pointer, a quite wrong position is often indicated at the first laser irradiation time (first point). The operator can move the laser irradiation position to the desired position by visually recognizing the laser irradiation position and correcting the direction of the laser pointer relatively.

That is, the object can be attained by an action "visual recognition→correction→visual recognition". Instead of feeling that "the irradiation position is wrong although indication is done properly", the human ability (an ability for indicating a correct direction) can be compensated by correction operation.

As is apparent from the above examination, in the remote input mode, the position of the pen at the first point input is no important factor. When the coordinate input pen 4 is moved from that position to move the cursor in correspondence with the moving amount, remote input can be performed with good operability.

That is, when a mechanism capable of faithfully reproducing the moving amount and direction of the coordinate input pen 4, which are realized by human operation, can be obtained, information displayed on the screen can be controlled, and a handscript can be added by remote control. In addition, when this mechanism is used, the following advantage can be obtained.

In presentation at a conference or the like, it is a presenter or a host who expedites proceedings that executes pen input or proximity input. On the other hand, it is listeners who are at positions separated from the screen and see the contents displayed on the screen and listen to the presentation.

That is, the display screen is set at such a position that many listeners can see it. When a listener brings up a question or a suggestion for the contents of presentation, he/she may, e.g., display another information or evidence through the network or add information to the materials of the presenter a his/her position (the position separated from the display screen).

In this case, the listener is preferably able to all desired operations at his/her position. This can be realized in the second embodiment.

For example, it will be described with reference to FIG. 12. It is quite possible that many listeners are placed outside the area of the space (a rectangular columnar space formed about the Z-axis) formed by projecting the display area of the display apparatus 6 in the Z-axis direction. When three-dimensional position coordinates are detected by operating the coordinate input pen 4 outside that space, the coordinates are located outside the area of the display screen. Hence, the cursor operation on the display screen cannot be implemented.

To cope with this situation, the coordinate values of the first point are stored. Subsequent coordinate values are output as differential values form the stored coordinate values. In other words, when the coordinate values of the first point are detected, for example, the displayed cursor is not moved at all. Then, when the differential values of the coordinate values are calculated, the cursor is moved by the differential amounts.

With this arrangement, even when the coordinate input pen 4 is located outside the area of the space formed by projecting the display area of the display apparatus 6 in the Z-axis direction, a comfortable operation environment for the above-described remote control can be realized.

The definition of the "coordinate values of the first point" will be described next.

The coordinate input apparatus is designed to detect and output coordinate values at a predetermined period. When the coordinate calculation sampling rate (the possible number of times of coordinate calculation per unit time) is referred to, it can be determined whether coordinate input is continuously executed.

The state wherein coordinate input is continuously executed is a state wherein at least one of the pen point SW 41 and pen side SWs 42a and 42b is in the ON state, and an ultrasonic wave is radiated from the coordinate input pen 4 at a predetermined period. That is, when the period of the above-described optical signal synchronized with the ultrasonic wave radiation timing is counted, the state can be determined.

The "coordinate values of the first point" mean coordinate values that become effective for the first time within the continuous period. From this point of time, all coordinate values in this period are compared with the first coordinate values, and differential values therebetween are output.

The above-described effective "coordinate values of the first point" are not limited to the first point of the continuous coordinate input. The "coordinate values of the first point" mean coordinate values that become effective for the first time within the continuous input period.

That is, in coordinate input apparatuses of some types, coordinate values input first are not so reliable (e.g., a coordinate input apparatus employing a coordinate detection method in which coordinate values are not output until the third point during the continuous input period, and effective coordinate values are output from the fourth point at which stable coordinate detection is possible). In this case, for example, the first coordinate values (the coordinate values of the fourth point in the above example) that become effective during the continuous input period are stored.

A detailed example will be described with reference to FIG. 19.

Figure 19:
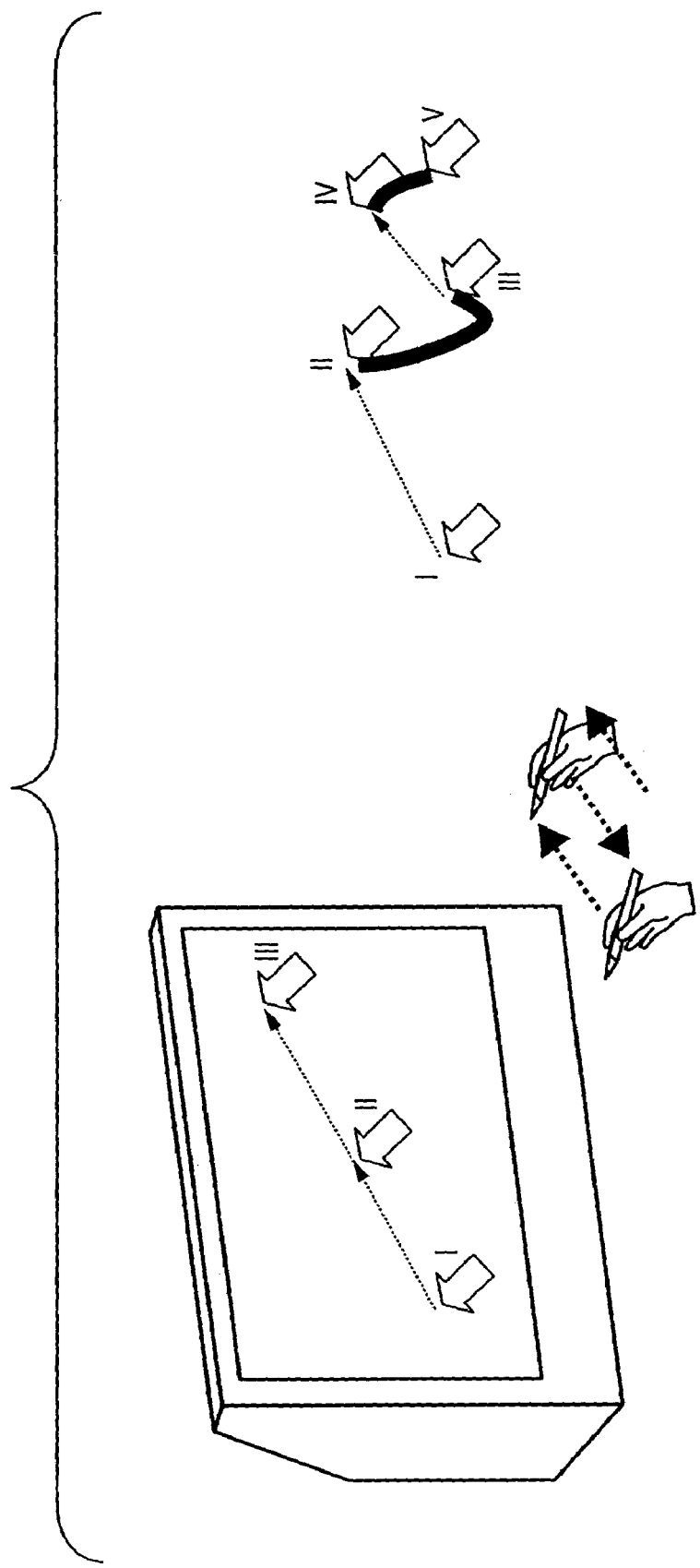
FIG. 19 is a view for explaining an operation example of the coordinate input pen according to the second embodiment of the present invention.

The illustration on the left side of FIG. 19 indicates an example in which the displayed cursor is moved from a corner position I (the current position of the displayed cursor) to another corner position III in the diagonal direction. The operator of remote control first operates one of the pen side SWs 42a and 42b at an arbitrary position and moves the coordinate input pen 4 toward III.

The cursor moves as the moving amount and direction of the pointing tool from the arbitrary position are reproduced. Assume that the operator cannot move the cursor anymore toward III unless he/she "walks" or "changes his/her posture" in addition to movement of the arm (the cursor position is II).

At this time, the operator cancels the pen side SW that has been operated so far. For example, the operator returns the coordinate input pen 4 to the arbitrary position described above and operates the pen side SW again. Since the radiation of the ultrasonic wave that is radiated at a predetermined period stops simultaneously with the cancel of the pen side SW, it can be determined that the continuously input state is reset.

As described above, even when the pen side SW is operated again (the position of the coordinate input pen 4 has moved), the cursor position remains II. When the operator operates the pen side SW again and moves the coordinate input pen 4 while visually recognizing the cursor position, the cursor can be moved toward III, so the object can be attained.

The illustration on the right side of FIG. 19 indicates an example in which a character is to be written. First, the cursor is moved to the desired position II in accordance with the example shown on the left side of FIG. 19. At this time, the pen side SW may be either set in the OFF state or kept in the ON state. The pen side SW is turned off probably when the character cannot be written unless the operator "walks" or "changes his/her posture" because of the character size. The pen side SW can be kept in the ON state probably when the character can be input only by moving the arm.

In the former case, the "coordinate values of the first point" in inputting a character "い" correspond to the position coordinates of the coordinate input pen 4 that indicates the position II. In the latter case, the "coordinate values of the first point" correspond to the position coordinates of the coordinate input pen 4 that indicates the position I. After the cursor is moved to the position II, both the pen side SWs 42a and 42b are operated (pen down state). The cursor is moved to the position III by moving the coordinate input pen 4 so that a handscript corresponding to the moving amount and direction of the coordinate input pen 4 is left on the screen.

At the position III, the operator cancels one of the pen side SWs 42a and 42b (pen up state: since the remaining side SW is in the operative state, an ultrasonic wave signal is radiated at a predetermined period), moves the cursor to a position IV, operates (pen down) both the pen side SWs again, and moves the cursor to a position V, thereby leaving the handscript on the screen.

The operator must move the cursor to the first position II by moving the coordinate input pen 4 while visually recognizing the cursor. However, he/she can input the character "い" in accordance with the absolute moving amount of the coordinate input pen 4, i.e., by intuitively moving the hand or arm without visually recognizing the cursor.

More specifically, when the first effective coordinate values during the continuous input period are used as a reference, coordinate values output during the continuous period have relative values. When viewed from the operator, the cursor moving amount corresponds to the movement of the hand or arm during that period. Hence, e.g., intuitive text input operation can be realized.

The above processing will be described with reference to FIG. 20.

Figure 20:
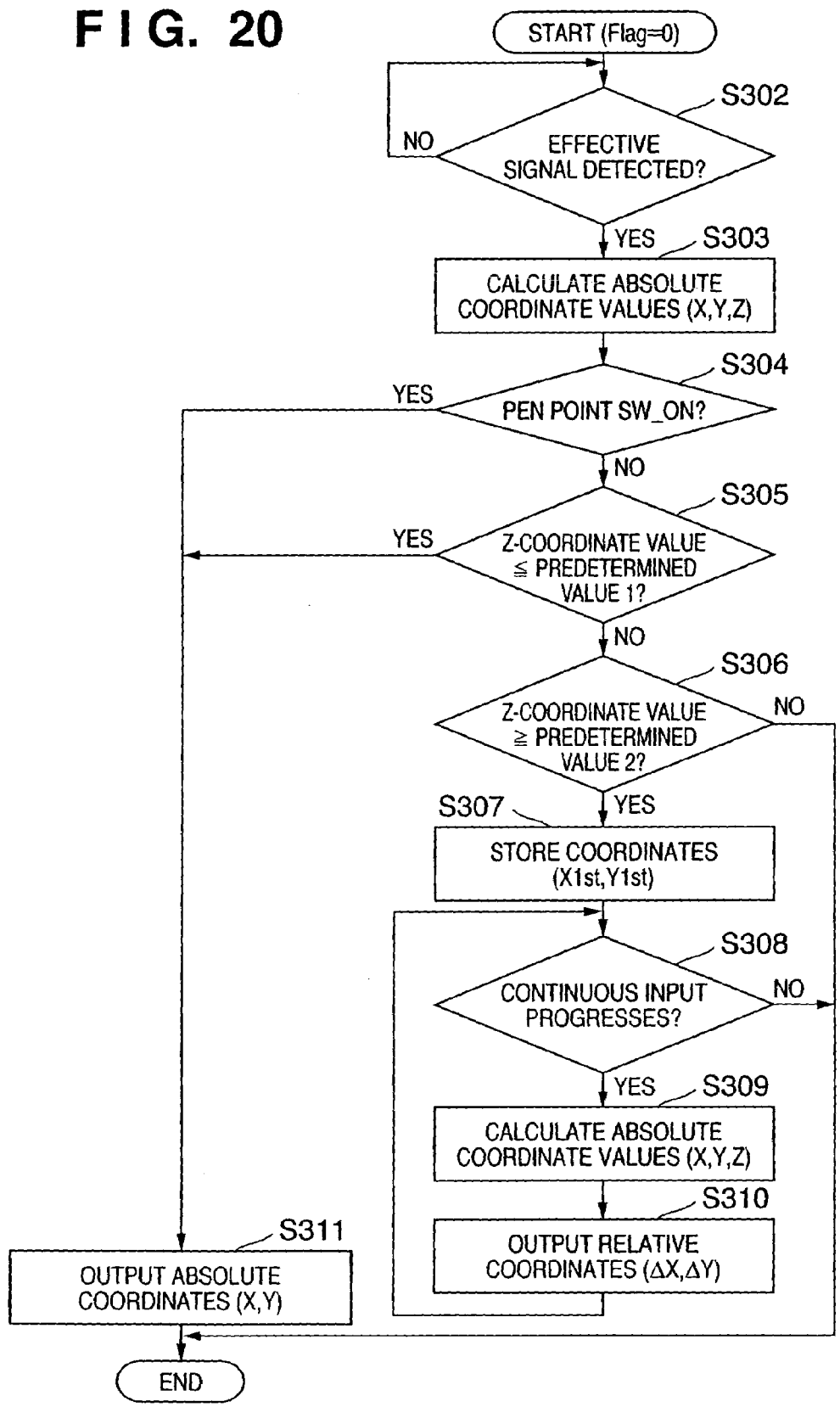
FIG. 20 is a flow chart for explaining the operation of a coordinate input apparatus according to the second embodiment of the present invention.

FIG. 20 is a flow chart for explaining the operation of the coordinate input apparatus according to the second embodiment of the present invention.

The flow chart shown in FIG. 20 operates on the basis of the operation mode shown in FIG. 16.

In step S302, it is determined whether an effective signal as information necessary for coordinate detection is detected (in the second embodiment, for example, whether the ultrasonic wave signal radiated from the coordinate input pen 4 is received by the detection sensor 3 is determined, as will be described later).

If no effective signal is detected (NO in step S302), a standby state is set until an effective signal is detected. If an effective signal is detected (YES in step S302), the flow advances to step S303 to calculate the three-dimensional position coordinate values (X,Y,Z) (absolute coordinate values) of the coordinate input pen 4.

In step S304, the state of the pen point SW 41 of the coordinate input pen 4, which is transmitted by an optical signal synchronized with the ultrasonic wave radiation timing, is determined. In this case, it is determined whether the pen point SW 41 is in the operative state, i.e., whether the pen point SW 41 is pressed and set in the pen input state (ON).

If the pen input state is set (YES in step S304), the flow advances to step S311 to output at least two-axes coordinate values (X,Y) of the three-axes coordinate values (X,Y,Z) obtained in step S303, and for example, a handscript corresponding to the movement of the coordinate input pen 4 is displayed on the display screen.

On the other hand, if the pen point SW 41 is not in the pen input state (NO in step S304), the flow advances to step S305 to compare the calculated coordinate value Z in the Z-axis direction with predetermined value 1 and determine whether the proximity input state is set.

If the proximity input state is set, i.e., the Z-coordinate value is equal to or smaller than predetermined value 1 (YES in step S305), the flow advances to step S311 to output at least two-axes coordinate values (X,Y) of the three-axes coordinate values (X,Y,Z) obtained in step S303.

If the proximity input state is not set in step S305, i.e., the Z-coordinate value is larger than predetermined value 1 (NO in step S305), the flow advances to step S306 to compare the calculated coordinate value Z in the Z-axis direction with predetermined value 2 and determine whether the remote input state is set. If the remote input state is not set, i.e., the Z-coordinate value is smaller than predetermined value 2 (NO in step S306), the processing is ended without executing any operation.

If the remote input state is set in step S306, i.e., the Z-coordinate value is equal to or larger than predetermined value 2 (YES in step S306), the flow advances to step S307 to store, in the nonvolatile memory, the already calculated coordinate values (the coordinate values obtained in step S303) as the "coordinate values of the first point" (X1st, Y1st).

In step S308, for example, the reception timing of an optical signal (a signal synchronized with the ultrasonic wave radiation timing at a predetermined period) based on the coordinate calculation sampling rate of the coordinate input apparatus is monitored, thereby determining whether coordinate input is continuously executed.

If coordinate input is continuously executed (YES in step S308), the flow advances to step S309 to calculate the absolute coordinate values (X,Y,Z). Then, in step S310, the absolute coordinate values are compared with the coordinate values (X1st,Y1st) stored in step S307. Relative coordinate values ($\Delta X, \Delta Y$) as the differential values are output, and the flow returns to step S308.

If coordinate input is not continuously executed in step S308 (NO in step S308), the nonvolatile memory is released, and the processing is ended. The state for waiting for detection of an effective signal is set again in step S302.

In the second embodiment, predetermined value 1 in step S305 and predetermined value 2 in step S306 may be the same value or different values. For example, when predetermined value 1=100 mm and predetermined value 2=1000 mm, operation can be inhibited while the Z-coordinate value is 100 to 1,000 mm. The settings are appropriately done in accordance with the application purpose.

As described above, when the screen surface is to be directly touched to input coordinates and add a handscript or control a personal computer, or remote control is to be performed to execute the same operation as described above at a position separated from the screen using the coordinate input apparatus, various kinds of switches of the coordinate input pen 4 are assigned to operations, and some of the switches are operated to periodically radiate a sonic wave. Simultaneously, a signal synchronized with the sonic wave radiation and an optical signal which transmits the state (pen up/down state and pen ID number) of the coordinate input pen 4 are radiated.

Signal processing and coordinate calculation principle by radiated sonic wave and optical wave will be described next.

The coordinate input apparatus according to the second embodiment is a system which basically obtains position information of the sonic wave generation source 43 of the coordinate input pen 4, as in the first embodiment. An arrival time detection method of detecting a sonic wave arrival time will be described with reference to FIGS. 21 and 22.

Figure 21:
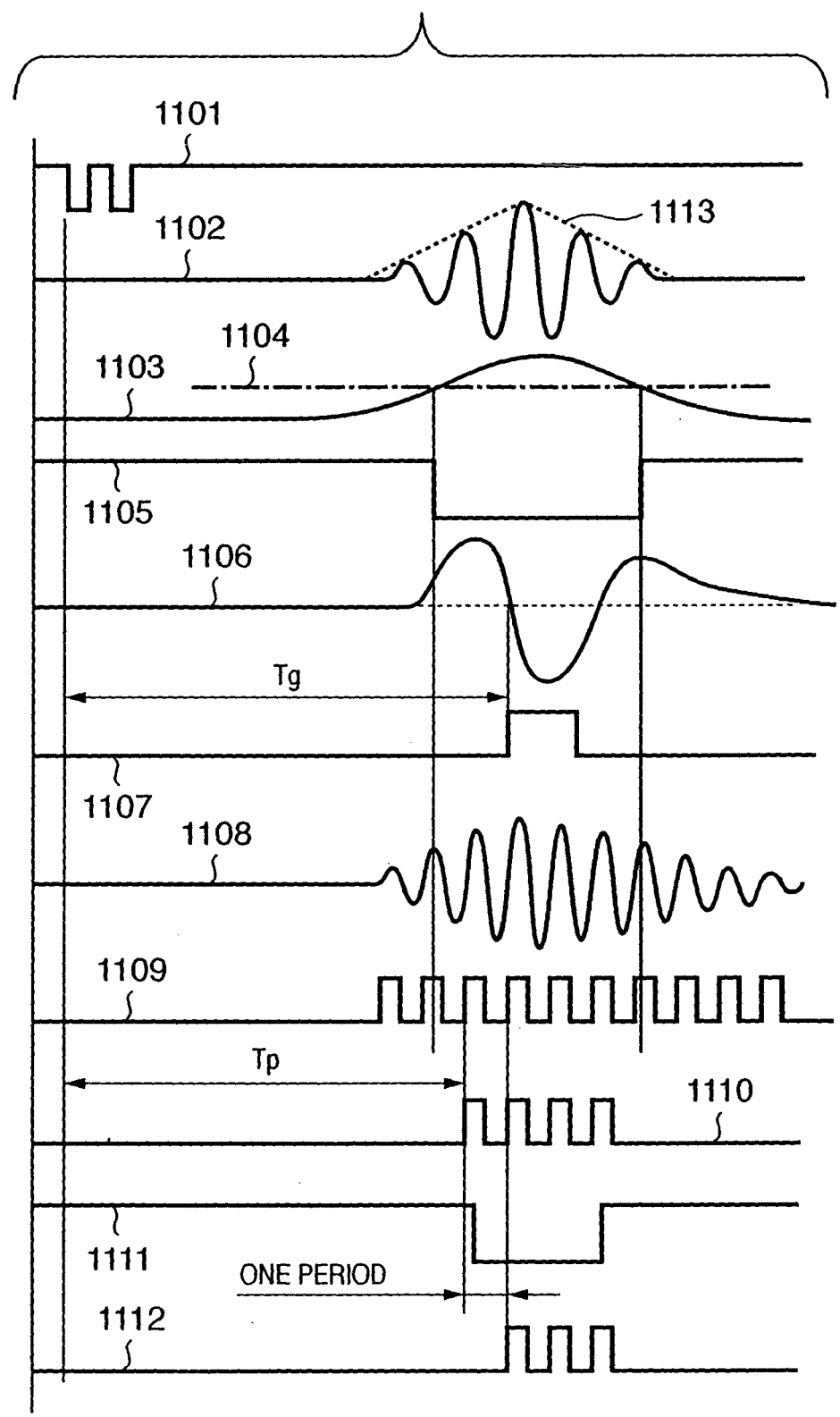
FIG. 21 is a timing chart for explaining a sonic wave arrival time detection method according to the second embodiment of the present invention.

FIG. 21 is a timing chart for explaining a sonic wave arrival time detection method according to the second embodiment of the present invention. FIG. 22 is a block diagram of a detection circuit which realizes sonic wave arrival time detection according to the second embodiment of the present invention.

Reference numeral 1101 denotes a driving signal for the sonic wave generation source 43, which is generated by the driving circuit 44. Synchronously, a start signal as an optical signal which transmits the timing information of ultrasonic wave generation from the infrared LED 46 is radiated. This optical signal is detected through the photosensor 7. The optical signal transmits to the arithmetic control circuit 1 the ultrasonic wave generation timing or the state (e.g., pen up/down state) of the coordinate input pen 4 through a frequency detection circuit 210 and control signal detection circuit 211 and starts a timer 12 (FIG. 9) in the arithmetic control circuit 1.

A sonic wave radiated into the air is delayed in accordance with the distances between the sonic wave generation source 43 and detection sensors 3_Sa to 3_Sd and detected by the detection sensors 3_Sa to 3_Sd. Reference numeral 1102 denotes a detection signal detected by the detection sensors 3_Sa to 3_Sd and amplified to a predetermined level by a pre-amplification circuit 201. The detection signal 1102 is processed by an envelope detection circuit 203 to extract an envelope 1113 of a detection signal 1103.

In accordance with a signal 1107 generated by a Tg signal detection circuit 207 on the basis of the envelope 1113, a delay time tg related to a group velocity Vg is obtained. The function of an envelope singular point detection circuit 206 is the same as that of the envelope singular point detection circuit 62 of the first embodiment.

In the second embodiment, second-order differentiation is executed to form a signal 1106, and the inflection point of the envelope 1113 is detected with reference to a gate signal obtained by comparing a threshold level 1104 with the detection signal 1103 (signal 1107).

A distance L between the sonic wave generation source 43 and each of the detection sensors 3_Sa to 3_Sd can be obtained by equation (1) described in the first embodiment.

To more accurately calculate the distance L, the sonic wave arrival time is derived from the phase information of the detection signal waveform, as in the first embodiment. That is, an extra frequency component of the output signal 1102 is removed by a bandpass filter 208. Then, the signal 1102 is input to a Tp signal detection circuit 209. A signal 1109 related to the zero-crossing point of a signal 1108 output from the bandpass filter 208 is generated.

The signal 1109 is compared with a gate signal 1105 produced by a gate signal generation circuit 205 which compares the detection signal with the predetermined threshold level 1104, thereby producing a signal 1110 which outputs the first zero-crossing point where the phase of the signal waveform output from the bandpass filter 208 crosses from, e.g., the negative side to the positive side in the period of the gate signal 1105. In a similar way, a phase delay time Tp related to a phase velocity Vp can be detected using the signal 1110.

Accordingly, the distance L between the sonic wave generation source 43 and each of the detection sensors 3_Sa to 3_Sd can be obtained by $$L = Vp \times Tp + n \times \lambda p \qquad (14)$$

where $\lambda p$ is the wavelength of the sonic wave, and n is an integer. The second term ($n \times \lambda p$) on the right-hand side of equation (14) means that when the sonic wave detection level becomes low, the level of the envelope 1113 also lowers. For this reason, the gate signal generation period of the gate signal 1105 generated by comparing the envelope 1113 with the threshold level 1104 is represented by, e.g., a signal 1111.

That is, the gate signal generation period depends on the signal level of the detection signal 1102. The largest factor for the change in signal level is the distances between the sonic wave generation source 43 and the detection sensors 3_Sa to 3_Sd. As is well known, the signal level exponentially decreases in accordance with the distance.

Hence, although the phase delay time Tp should be originally detected on the basis of the signal 1110, the generation period of the gate signal 1105 may change due to the lower signal level, and the phase delay time Tp may be detected on the basis of a signal 1112.

The time difference between the signals 1110 and 1112 corresponds to one period of the signal 1108. When this is converted into a distance, it corresponds to the wavelength of the sonic wave. That is, the distance L derived on the basis of the phase delay time Tp and phase velocity Vp contains an error corresponding to an integer multiple of the wavelength in accordance with the signal level. Hence, the second term on the right-hand side of equation (14) is the correction term.

The distances L derived by equations (1) and (14) should have the same value. Hence, when equations (1) and (14) are used as simultaneous equations, the integer n can be obtained by $$n = Int[(Vg \times Tg - Vp \times Tp)/\lambda p + 0.5)] \quad (15)$$

Integer calculation is executed in equation (15) because the performance of distance calculation based on the group delay time Tg is lower than that of distance calculation based on the phase delay time Tp, and the difference between the calculations should be absorbed. Assume that the distance calculation based on the phase delay time Tp has no error. In this case, even when an error equal to or smaller ½ the wavelength is contained in the distance calculation based on the group delay time Tg, the calculation of the integer n by equation (15) is accurately executed, so the distance can be accurately derived by equation (14).

The arithmetic control circuit according to the second embodiment corresponds to the arithmetic control circuit according to the first embodiment shown in FIG. 9. Especially, in the second embodiment, when the coordinate position information or the state signal (the pen up/down state or pen ID) of the coordinate input pen 4 is output to an interface circuit (not shown) through an I/O port 16, the coordinate values or control signal can be output to an external device.

In the second embodiment, the detected time contains an electrical processing time by the circuits and the like in addition to the sonic wave arrival times from the sonic wave generation source 43 to the detection sensors 3_Sa to 3_Sd, as described in the first embodiment. In this case, the method of removing an extra measurement time other than the sonic wave propagation time, which is described in the first embodiment, can be applied even in the second embodiment. In addition, the position coordinates (X,Y,Z) of the sonic wave generation source 43 can also be obtained in accordance with the same procedures as described in the first embodiment.

As described above, according to the second embodiment, coordinate output states optimum for the coordinate input apparatus capable of three-dimensional input are prepared. In each of the "pen input state", "proximity input state", and "remote input state", an input means with good operability can be provided at a low cost independently of the operator's dominant hand or while preventing any decrease in operability in accordance with the individual difference in holding the coordinate input pen 4 as much as possible.

Third Embodiment

In the second embodiment, in the pen input state, the pen point touches the display screen of the wide-screen display, thereby inputting desired handscript information or operating an external device serving as a control apparatus. To do this, the coordinate input pen 4 has, at its distal end portion, the pen point SW 41 which operates upon brought into contact with the screen.

That is, in handwriting, when the coordinate input surface is touched with the pen point, the pen point SW 41 is operated to allow coordinate input. For example, when the pen point SW 41 is manually operated, the coordinate detection state is set, as a matter of course.

As a detailed example, if a listener who is listening to the presentation operates the pen point SW 41 of the coordinate input pen 4 accidentally (for example, the listener unconsciously or intentionally operates the pen point SW 41 or unconsciously hits an object such as a desk with the point of the pen point SW 41), coordinate values different from the speaker's desired coordinate values are detected.

Accordingly, handscript information desired by the speaker cannot be obtained, or desired control cannot be executed.

In the third embodiment, as an application of the second embodiment, an arrangement will be described, which particularly executes processing for confirming the presence/absence of erroneous operation in the pen input state in the coordinate input operation of the coordinate input apparatus. The operation of the coordinate input apparatus with such an arrangement will be described with reference to FIG. 23.

Figure 23:
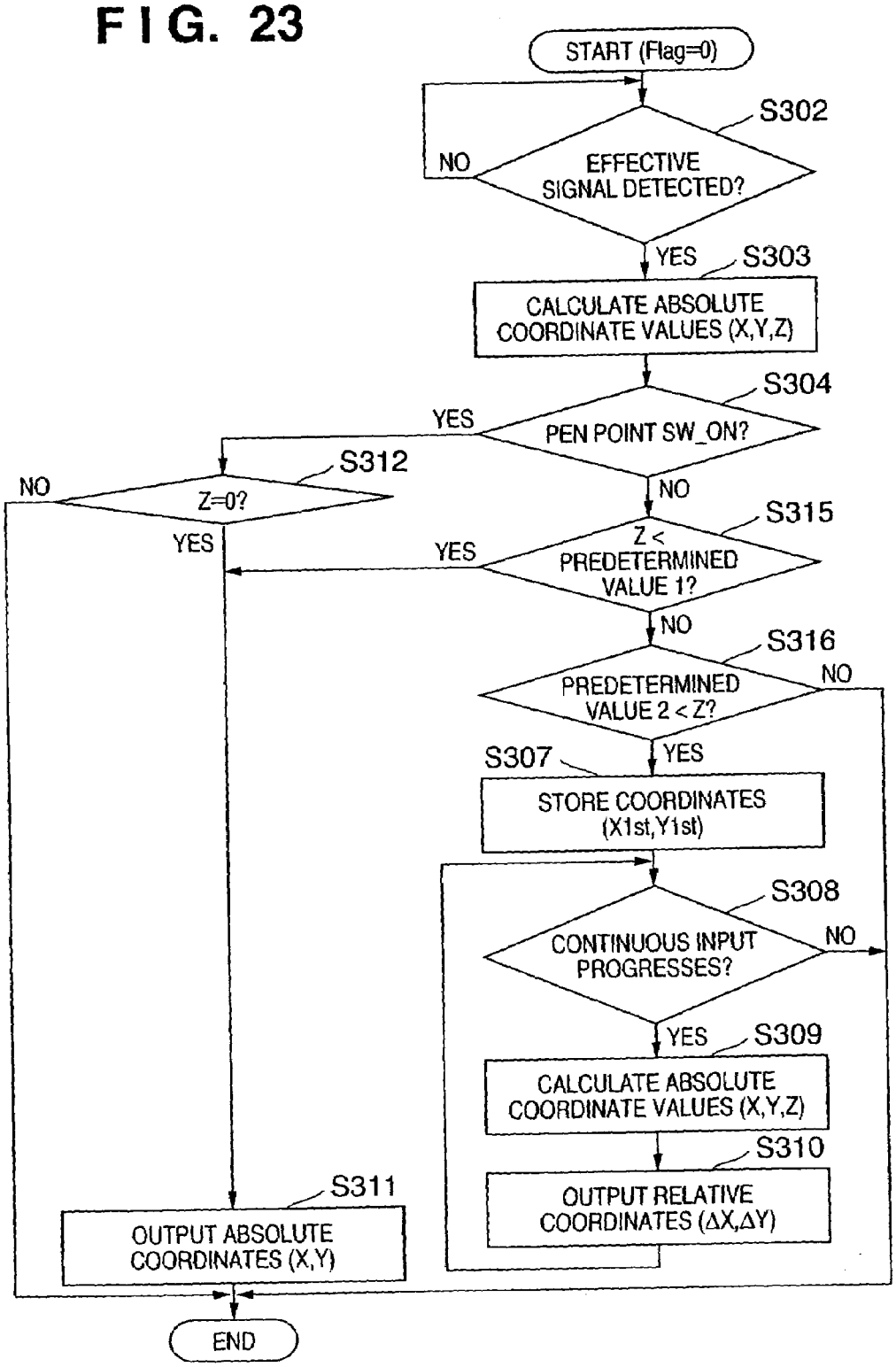
FIG. 23 is a flow chart for explaining the operation of a coordinate input apparatus according to the third embodiment of the present invention.

FIG. 23 is a flow chart for explaining the operation of a coordinate input apparatus according to the third embodiment of the present invention.

The same step numbers as in the flow chart shown in FIG. 20 of the second embodiment denote the same processes in the flow chart shown in FIG. 23 of the third embodiment, and a detailed description thereof will be omitted. The flow chart shown in FIG. 23 operates on the basis of the operation mode shown in FIG. 24.

In step S304, the state of a pen point SW 41 of a coordinate input pen 4, which is transmitted by an optical signal synchronized with the ultrasonic wave radiation timing, is determined. In this case, it is determined whether the pen point SW 41 is in the operative state, i.e., whether the pen point SW 41 is pressed and set in the pen input state (ON). If the pen input state is set (YES in step S304), the flow advances to step S312 to determine whether the Z-coordinate value of the detected coordinate values is 0. In other words, it is confirmed that the coordinate input pen 4 touches the coordinate input surface, and the pen point SW 41 is operating.

When Z-coordinate value=0 in step S312 (YES in step S312), the flow advances to step S311 to output at least two-axes coordinate values (X,Y) of the three-axes coordinate values (X,Y,Z) obtained in step S303, and for example, a handscript corresponding to the movement of the coordinate input pen 4 is displayed on the display screen.

If Z-coordinate value≠0 (NO in step S312), it can be determined that the pointing tool 4 is not located on the coordinate input surface although the pen point SW 41 is operating (the obtained coordinate values are coordinate values obtained by erroneous operation by the operator). Hence, the processing is ended without outputting the coordinate values to an external device or the like. The flow returns to step S302 to set the state for waiting for detection of an effective signal.

On the other hand, if the pen point SW 41 is not in the pen input state (NO in step S304), in step S315 the calculated coordinate value Z in the Z-axis direction is compared with predetermined value 1 to determine whether the proximity input state is set. If the proximity input state is set, i.e., the Z-coordinate value is equal to or smaller than predetermined value 1 (YES in step S315), the flow advances to step S311 to output at least two-axes coordinate values (X,Y) of the three-axes coordinate values (X,Y,Z) obtained in step S303.

If the proximity input state is not set in step S315, i.e., the Z-coordinate value is larger than predetermined value 1 (NO in step S315), the flow advances to step S316 to compare the calculated coordinate value Z in the Z-axis direction with predetermined value 2 and determine whether the remote input state is set. If the remote input state is not set, i.e., the Z-coordinate value is smaller than predetermined value 2 (NO in step S316), the processing is ended without executing any operation.

If the remote input state is set in step S316, i.e., the Z-coordinate value is equal to or larger than predetermined value 2 (YES in step S316), the flow advances to step S307 to store, in the nonvolatile memory, the already calculated coordinate values as the "coordinate values of the first point" (X1st,Y1st).

As described above, according to the third embodiment, since the validity of the calculated coordinate values is determined, any erroneous operation by the operator can be prevented, so a convenient coordinate input apparatus can be constituted.

In addition, coordinate output states optimum for the coordinate input apparatus capable of three-dimensional input are prepared. In each of the "pen input state", "proximity input state", and "remote input state", an input means with good operability can be provided at a low cost while preventing any decrease in operability as much as possible.

The embodiments have been described above in detail. The present invention may be applied to a system constituted by a plurality of devices or an apparatus comprising a single device.

The present invention also incorporates a case wherein its object is achieved by supplying a software program (a program corresponding to the flow charts illustrated in the embodiments) which implements the functions of the above-described embodiments to the system or apparatus directly or from a remote site and causing the computer of the system or apparatus to read out and execute the supplied program codes.

The program codes installed in the computer to implement the functional processing of the present invention also implements the present invention by themselves. That is, the present invention also incorporates the computer program which implements the functional processing of the present invention.

In this case, the program can employ any form such as an object code, a program executed by an interpreter, or script data to be supplied to an OS as far as the functions of the program can be obtained.

As the recording medium for supplying the program, for example, a floppy disk (registered trademark), hard disk, optical disk, magnetooptical disk, MO, CD-ROM, CD-R, CD-RW, magnetic tape, nonvolatile memory card, ROM, DVD (DVD-ROM or DVD-R), or the like can be used.

As another program supply method, a client computer may be connected to a homepage on the Internet using a browser, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs part or all of actual processing on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus which calculates position coordinates of a coordinate input pointing tool with respect to a coordinate input surface, comprising:
   calculation means for calculating the position coordinates of the coordinate input pointing tool;
   change means for changing the position coordinates by multiplying the position coordinates by a predetermined coefficient that is obtained on the basis of a coordinate with a vertical direction axis with respect to the coordinate input surface, and that is related to a distance between the coordinate input surface and the coordinate input pointing tool; and
   output means for outputting the position coordinates changed by said change means.

2. The apparatus according to claim 1, further comprising interpolation means for interpolating the position coordinates changed by said change means.

3. A control method of a coordinate input apparatus which calculates position coordinates of a coordinate input pointing tool with respect to a coordinate input surface, comprising:
   a calculation step of calculating the position coordinates of the coordinate input pointing tool;
   a change step of changing the position coordinates by multiplying the position coordinates by a predetermined coefficient that is obtained on the basis of a coordinate with a vertical direction axis with respect to the coordinate input suface, and that is related to a distance between the coordinate input, surface and the coordinate input pointing tool; and
   an input step of inputting the position coordinates changed in said change step.

4. A computer program stored in a memory which causes a computer to control a coordinate input apparatus which calculates position coordinates of a coordinate input pointing tool with respect to a coordinate input surface, comprising:
   program code for a calculation step of calculating the position coordinates of the coordinate input pointing tool;
   program code for a change step of changing the position coordinates by multiplying the position coordinates by a predetermined coefficient that is obtained on the basis of a coordinate with a vertical direction axis with respect to the coordinate input surface, and that is related to a distance between the coordinate input surface and the coordinate input pointing tool; and
   program code for an output step of outputting the position coordinates changed in the change step.

* * * * *

UNITED STATES PATENT AND TRADEMARK OFFICE
CERTIFICATE OF CORRECTION

PATENT NO.       : 7,158,117 B2
APPLICATION NO.  : 10/629621
DATED            : January 2, 2007
INVENTOR(S)      : Hajime Sato et al.

It is certified that error appears in the above-identified patent and that said Letters Patent is hereby corrected as shown below:

<u>TITLE PAGE [57] ABSTRACT</u>

Line 3, "of," should be deleted.

<u>COLUMN 2</u>

Line 21, "ten" should read --the--.

<u>COLUMN 4</u>

Line 2, "Predetermined" should read --predetermined--.

<u>COLUMN 7</u>

Line 25, "pointing" should read --pointing at--.

<u>COLUMN 11</u>

Line 59, "with an emphasis" should be deleted.

<u>COLUMN 14</u>

Line 14, "examples," should read --example,--.

<u>COLUMN 15</u>

Line 53, "air" should read --air are--.

<u>COLUMN 23</u>

Line 7, "Principle" should read --principle--.

<u>COLUMN 25</u>

Line 28, "can" should read --can be--.

<u>COLUMN 26</u>

Line 6, "a" should read --at--.
    Line 8, "able to all" should read --able to do all--.

UNITED STATES PATENT AND TRADEMARK OFFICE
CERTIFICATE OF CORRECTION

PATENT NO. : 7,158,117 B2
APPLICATION NO. : 10/629621
DATED : January 2, 2007
INVENTOR(S) : Hajime Sato et al.

It is certified that error appears in the above-identified patent and that said Letters Patent is hereby corrected as shown below:

COLUMN 31

Line 15, "smaller" should read --smaller than--
Line 56, "upon" should read --upon being--.

COLUMN 33

Line 27, "implements" should read --implement--.

COLUMN 34

Line 42, "input," should read --input--.

Signed and Sealed this

Twelfth Day of June, 2007

JON W. DUDAS
*Director of the United States Patent and Trademark Office*